US010408977B2

(12) United States Patent
Che et al.

(10) Patent No.: US 10,408,977 B2
(45) Date of Patent: Sep. 10, 2019

(54) LENTICULAR SHEET, METHOD FOR MANUFACTURING SAME, AND LENTICULAR DISPLAY BODY

(71) Applicant: FUJIFILM CORPORATION, Minato-ku, Tokyo (JP)

(72) Inventors: Yanlong Che, Shizuoka (JP); Ryou Hibino, Shizuoka (JP); Ryuichi Katsumoto, Shizuoka (JP); Masahiko Noritsune, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 134 days.

(21) Appl. No.: 15/649,643

(22) Filed: Jul. 14, 2017

(65) Prior Publication Data

US 2017/0315272 A1    Nov. 2, 2017

Related U.S. Application Data

(63) Continuation of application No. PCT/JP2016/051047, filed on Jan. 14, 2016.

(30) Foreign Application Priority Data

Jan. 15, 2015  (JP) .................................. 2015-006067
Feb. 9, 2015   (JP) .................................. 2015-023701
Jul. 3, 2015   (JP) .................................. 2015-134814

(51) Int. Cl.
*G02B 3/06*     (2006.01)
*B29D 11/00*    (2006.01)
*G02B 3/00*     (2006.01)

(52) U.S. Cl.
CPC ........ *G02B 3/005* (2013.01); *B29D 11/00278* (2013.01); *G02B 3/0012* (2013.01); *G02B 3/06* (2013.01)

(58) Field of Classification Search
CPC ........ G02B 3/005; G02B 3/0012; G02B 3/06; B29D 11/00278
(Continued)

(56) References Cited

U.S. PATENT DOCUMENTS 3,264,164 A *  8/1966  Jerothe .................. B32B 27/00
                                                        101/32
2007/0111171 A1 * 5/2007 Kane ...................... G09B 19/00
                                                        434/156
(Continued)

FOREIGN PATENT DOCUMENTS

JP    2003-262929 A    9/2003
JP    2004-106283 A    4/2004
(Continued)

OTHER PUBLICATIONS

English language translation of the following: Office action dated Feb. 27, 2018 from the JPO in a Japanese patent application No. 2016-569515 corresponding to the instant patent application. This office action translation is submitted now in order to supplement the understanding of the cited reference(s) being disclosed in the instant Information Disclosure Statement.
(Continued)

*Primary Examiner* — James R Greece
(74) *Attorney, Agent, or Firm* — SOLARIS Intellectual Property Group, PLLC

(57) ABSTRACT

The present invention provides a lenticular sheet including a transparent resin substrate stretched in at least one direction, an ink receiving layer provided on one surface side of the transparent resin substrate, and a lenticular lens layer provided on the other surface side of the transparent resin substrate, in which the ink receiving layer is formed on the one surface side of the transparent resin substrate by stretching a transparent resin substrate which is not stretched or stretched in a first direction and on which a coating layer is
(Continued)

formed by coating one surface side of the substrate with a coating solution for forming an ink receiving layer; a method for manufacturing a lenticular sheet; and a lenticular display body.

21 Claims, 9 Drawing Sheets

(58) Field of Classification Search
USPC .......................................................... 359/619
See application file for complete search history.

(56) References Cited

U.S. PATENT DOCUMENTS

| | | | |
|---|---|---|---|
| 2007/0248774 | A1 | 10/2007 | Suzuki et al. |
| 2007/0263296 | A1 | 11/2007 | Suzuki et al. |
| 2011/0157293 | A1 | 6/2011 | Ohtani et al. |
| 2012/0236416 | A1* | 9/2012 | Sugahara ............... G02B 3/005 359/619 |
| 2012/0268598 | A1 | 10/2012 | Holmes et al. |

FOREIGN PATENT DOCUMENTS

| | | |
|---|---|---|
| JP | 2007-152589 A | 6/2007 |
| JP | 2007-334091 A | 12/2007 |
| JP | 2008-112039 A | 5/2008 |
| JP | 3143782 U | 8/2008 |
| JP | 2009-58967 A | 3/2009 |
| JP | 2011-148266 A | 8/2011 |
| JP | 2011-148285 A | 8/2011 |
| JP | 2013-509312 A | 3/2013 |
| JP | 2014-186051 A | 10/2014 |
| JP | 2014186051 A * | 10/2014 |
| WO | 2011/068112 A1 | 6/2011 |

OTHER PUBLICATIONS

Extended European Search Report dated Mar. 6, 2018, issued in corresponding EP Patent Application No. 16737438.8.
English language translation of the following: Office action dated Aug. 27, 2018 from the SIPO in a Chinese patent application No. 201680005753.9 corresponding to the instant patent application.
Partial supplementary Extended European Search Report dated Dec. 4, 2017, issued in corresponding EP Patent Application No. 16737438.8.
International Search Report issued in International Application No. PCT/JP2016/051047 dated Apr. 12, 2016.
Written Opinion of the ISA issued in International Application No. PCT/JP2016/051047 dated Apr. 12, 2016.

* cited by examiner

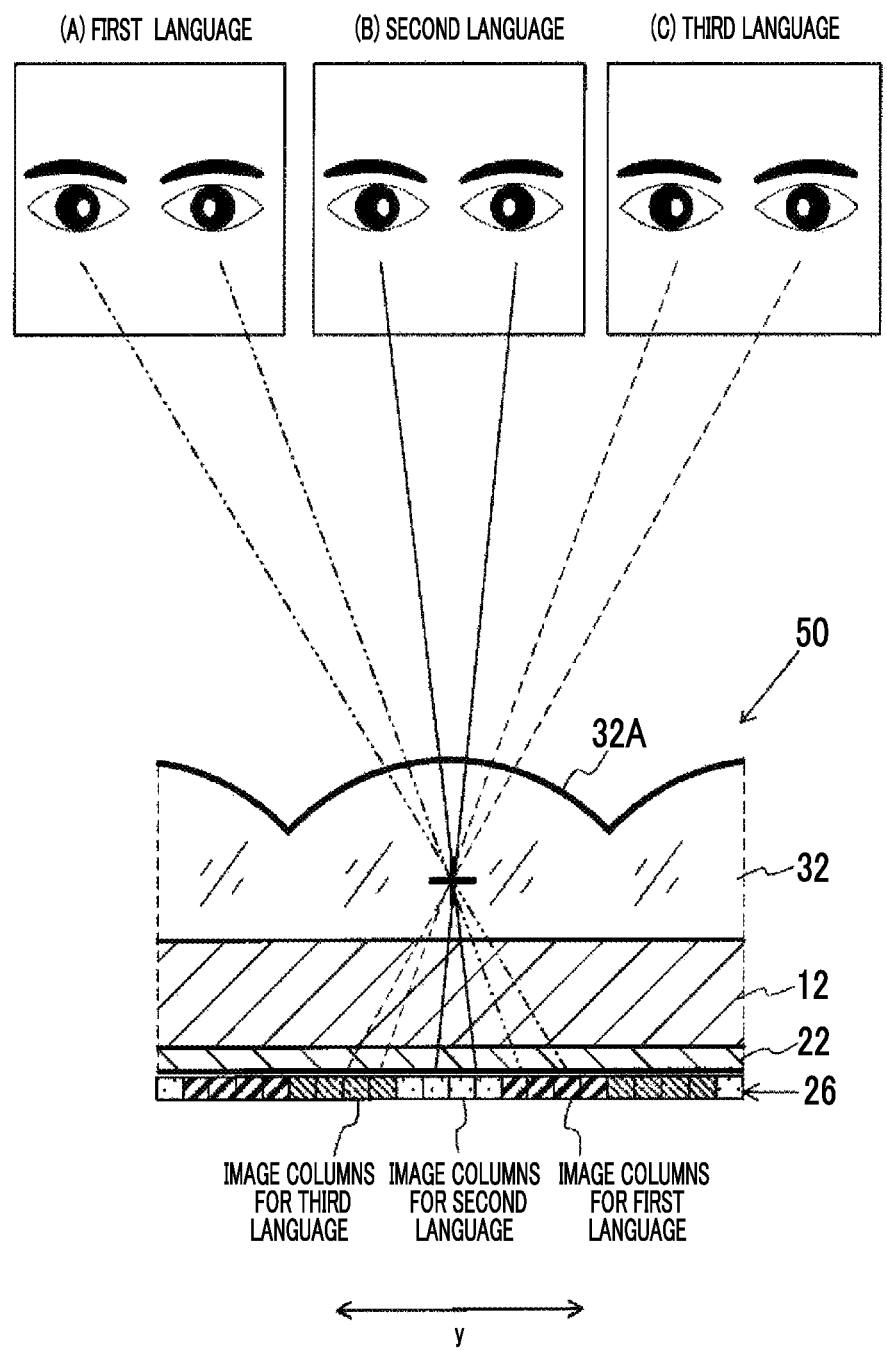

FIG. 7A

NIHON

知的財産部
部長

特許 太郎

日本株式会社
〒100-0000　東京都商標市意匠町100
　　Tel.03-1234-0000　　Fax.03-1234-1111
E-mail:taro-tokkyo@nihon.co.jp

FIG. 7B

NIHON

TARO TOKKYO
MANAGER
INTELLECTUAL PROPERTY DIV.

NIHON Corporation
100 ISHO-MACHI, SHOHYO-SHI
TOKYO, 100-0000, JAPAN
Tel.+81-3-1234-0000 Fax.+81-3-1234-1111
E-mail:taro-tokkyo@nihon.co.jp

LENTICULAR SHEET, METHOD FOR MANUFACTURING SAME, AND LENTICULAR DISPLAY BODY

CROSS-REFERENCE TO RELATED APPLICATION

This application is a Continuation of PCT International Application No. PCT/JP2016/051047, filed Jan. 14, 2016, which claims priority under 35 U.S.C. § 119(a) to Japanese Patent Application Nos. 2015-006067 filed Jan. 15, 2015, 2015-023701 filed Feb. 9, 2015, and 2015-134814 filed Jul. 3, 2015. Each of the above applications is hereby expressly incorporated by reference, in its entirety, into the present application.

BACKGROUND OF THE INVENTION

1. Field of the Invention

The present disclosure relates to a lenticular sheet, a method for manufacturing the same, and a lenticular display body.

2. Description of the Related Art

In the related art, as a recording sheet for recording a stereoscopic image or a picture changeable display image in which the contents of pictures displayed are switched according to the viewing direction, a recording sheet is known in which a lenticular lens layer and an ink receiving layer as a printing layer are provided on a transparent resin substrate.

For example, JP2009-58967A describes the following printing medium.

That is, JP2009-58967A describes a printing medium in which a lenticular lens layer is provided in a half of the area of one surface side of a rectangular substrate, a second printing surface is provided in the other half of the area, an adhesive layer is formed in an area, which corresponds to the half of the area provided with the lenticular lens layer, of the other surface side of the substrate, and a first printing surface is provided in the other half of the area of the other surface side.

JP2009-58967A states that the printing medium described in this document makes it possible to prepare a postcard in which a stereoscopic image can be observed by the following method.

A parallax image is printed on the first printing surface, an address is written on the second printing surface, the printing medium is folded in half, the lenticular lens layer side and the second printing surface side out, and then the aforementioned adhesive layer is bonded thereto in a state of being interposed therebetween, thereby preparing a postcard. In the prepared postcard, the image printed on the first printing surface can be observed as a stereoscopic image through the lenticular lens layer.

Herein, the parallax image (referred to as a "lenticular image" as well) is an image which includes two or more kinds of images under a lens sheet and displayed as different images according to the viewpoint of an observer when observed through the lens sheet.

Furthermore, for example, JP2011-148266A describes a lenticular sheet which has a lenticular lens layer on one surface side of a transparent resin substrate and an ink receiving layer on a surface of the transparent resin substrate that is opposite to the surface provided with the lenticular lens layer. JP2011-148266A describes that, by forming the ink receiving layer before forming the lenticular lens layer on the surface of the transparent resin substrate, the occurrence of distortion of the lenticular lens can be reduced.

SUMMARY OF THE INVENTION

The printing medium described in JP2009-58967A has a complicated constitution. Furthermore, in the postcard which is prepared using the printing medium described in JP2009-58967A and in which a stereoscopic image can be observed, the first printing surface on which the parallax image is formed and the substrate are bonded to each other through the adhesive layer, and hence the adhesiveness becomes insufficient in some cases.

Although the lenticular sheet described in JP2011-148266A has a simpler constitution compared to the printing medium described in JP2009-58967A, the adhesiveness between the transparent resin substrate and the ink receiving layer becomes insufficient in some cases.

Accordingly, an object of the present invention is to provide a lenticular sheet, which is excellent in the adhesiveness between a transparent resin substrate and an ink receiving layer, a method for manufacturing the same, and a lenticular display body.

The present invention for achieving the aforementioned object includes the following embodiments.

<1> A lenticular sheet comprising a transparent resin substrate stretched in at least one direction, an ink receiving layer provided on one surface side of the transparent resin substrate, and a lenticular lens layer provided on the other surface side of the transparent resin substrate, in which the ink receiving layer is formed on the one surface side of the transparent resin substrate by stretching a transparent resin substrate which is not stretched or stretched in a first direction and on which a coating layer is formed by coating one surface side of the substrate with a coating solution for forming an ink receiving layer.

<2> The lenticular sheet described in <1>, in which the ink receiving layer contains at least one resin, which is selected from a polyester, an acrylic resin, and a urethane resin, and a cross-linking agent.

<3> The lenticular sheet described in <2>, in which the cross-linking agent is at least one cross-linking agent selected from an oxazoline compound, a carbodiimide compound, and an isocyanate compound.

<4> The lenticular sheet described in any one of <1> to <3>, further comprising an interlayer containing a resin between the transparent resin substrate and the lenticular lens layer.

<5> The lenticular sheet described in any one of <1> to <4>, in which the transparent resin substrate stretched in at least one direction is a biaxially stretched polyethylene terephthalate film, and the ink receiving layer is formed by stretching the transparent resin substrate, on which a coating layer is formed by coating the substrate with the coating solution for forming an ink receiving layer and which is stretched in the first direction, in a second direction orthogonal to the first direction.

<6> The lenticular sheet described in any one of <1> to <5>, in which the lenticular lens layer has a plurality of lenses disposed at an interval of equal to or less than 257 µm.

<7> The lenticular sheet described in any one of <1> to <6> that has a thickness of equal to or greater than 30 µm and equal to or less than 400 µm.

<8> A method for manufacturing a lenticular sheet, comprising a laminate forming step of forming a laminate of a transparent resin substrate and a coating layer by coating one surface side of the transparent resin substrate, which is not stretched or stretched in a first direction, with a coating solution for forming an ink receiving layer, a laminate stretching step of stretching the laminate such that an ink receiving layer is formed on the one surface side of the transparent resin substrate stretched in at least one direction, and a lenticular lens layer forming step of forming a lenticular lens layer on a side opposite to the side of the transparent resin substrate, which is stretched in at least one direction in the laminate stretching step, opposite to the side provided with the ink receiving layer.

<9> The method for manufacturing a lenticular sheet described in <8>, comprising a laminate forming step of forming a laminate having a transparent resin substrate and a coating layer on both surfaces of the transparent resin substrate by coating one surface side of a transparent resin substrate, which is not stretched or stretched in a first direction, with a coating solution for forming an ink receiving layer and coating the other surface side of the transparent resin substrate with a coating solution for forming an interlayer, a laminate stretching step of stretching the laminate such that an ink receiving layer is formed on one surface side of the transparent resin substrate stretched in at least one direction and that an interlayer is formed on the other surface side of the transparent resin substrate stretched in at least one direction, and a lenticular lens layer forming step of forming a lenticular lens layer on the interlayer formed on a side of the transparent resin substrate, which is stretched in at least one direction in the laminate stretching step, opposite to the side provided with the ink receiving layer.

<10> The method for manufacturing a lenticular sheet described in <8> or <9>, in which the transparent resin substrate in the laminate forming step is a uniaxially stretched polyethylene terephthalate film stretched in the first direction, and a stretching direction in the laminate stretching step is a second direction orthogonal to the first direction in the uniaxially stretched polyethylene terephthalate film.

<11> A lenticular sheet comprising a transparent resin substrate, a first ink receiving layer provided to contact one surface of the transparent resin substrate, a second ink receiving layer provided on a side of the first ink receiving layer that is opposite to the transparent resin substrate side, and a lenticular lens layer provided on the other surface side of the transparent resin substrate, in which the first ink receiving layer is a layer of which the adhesiveness with respect to the transparent resin substrate is higher than the adhesiveness of the second ink receiving layer with respect to the transparent resin substrate, and the second ink receiving layer is a layer of which the adhesiveness with respect to ink is higher than the adhesiveness of the first ink receiving layer with respect to ink.

<12> The lenticular sheet described in <11>, in which the first ink receiving layer and the second ink receiving layer each independently contain at least one resin, which is selected from a polyester, an acrylic resin, and a urethane resin, and a cross-linking agent.

<13> A lenticular display body comprising the lenticular sheet described in any one of <1> to <7> or the lenticular sheet described in <11> or <12>, and an image layer including two or more kinds of parallax images that are arrayed in a longitudinal lens direction of the lenticular lens layer, in which the image layer is provided on a surface of the ink receiving layer of the lenticular sheet described in any one of <1> to <7> or on a surface of the second ink receiving layer of the lenticular sheet described in <11> or <12>.

<14> The lenticular display body described in <13>, in which the image layer includes two or more kinds of parallax images for display and a common image formed between the parallax images for display adjacent to each other by a portion common to the parallax images for display adjacent to each other.

<15> The lenticular display body described in <13> or <14> further comprising a protective layer protecting the image layer.

<16> The lenticular display body described in any one of <13> to <15>, in which two or more kinds of the parallax images for display included in the image layer contain character information to be each independently displayed in a plurality of languages, and when the image layer is observed through the lenticular lens layer, the languages displaying the character information are switched with each other according to an observation angle.

<17> The lenticular display body described in <16> that is a business card.

<18> The lenticular display body described in <16> or <17>, in which the character information is displayed in 3 or more languages that are switched according to the observation angle.

<19> The lenticular display body described in any one of <16> to <18>, in which the image layer includes common items common to at least two languages among the plurality of languages, and when the observation angle is changed, the common items are displayed in the same position between at least two languages including the common items.

<20> The lenticular display body described in any one of <16> to <19>, in which the lenticular lens layer and the image layer are provided on both surfaces of the lenticular display body, and on the both surfaces, the languages displaying the character information are switched respectively according to the observation angle.

<21> The lenticular display body described in any one of <13> to <20>, in which paper is bonded to the surface of the lenticular display body provided with the image layer.

<22> The lenticular display body described in <20> or <21>, in which the lenticular lens layer and the image layer are provided on both surfaces of the lenticular display body, the image layer on one surface contains character information displayed in three languages of the first to third languages that are switched with each other according to the observation angle, and the image layer on the other surface contains character information displayed in three languages of the fourth to sixth languages that are different from the first to third languages respectively and switched with each other according to the observation angle.

According to the present invention, there are provided a lenticular sheet, which is excellent in the adhesiveness between a transparent resin substrate and an ink receiving layer, a method for manufacturing a lenticular sheet, and a lenticular display body.

BRIEF DESCRIPTION OF THE DRAWINGS

FIG. 4 is a schematic view showing an example of the array of image columns disposed under a single lens in a lenticular display body according to an embodiment of the present disclosure.

FIGS. 7A and 7B are views showing an example in which common items are disposed in the same position within a business card in which a Japanese display and an English display can be switched with each other.

DESCRIPTION OF THE PREFERRED EMBODIMENTS

Figure 1:
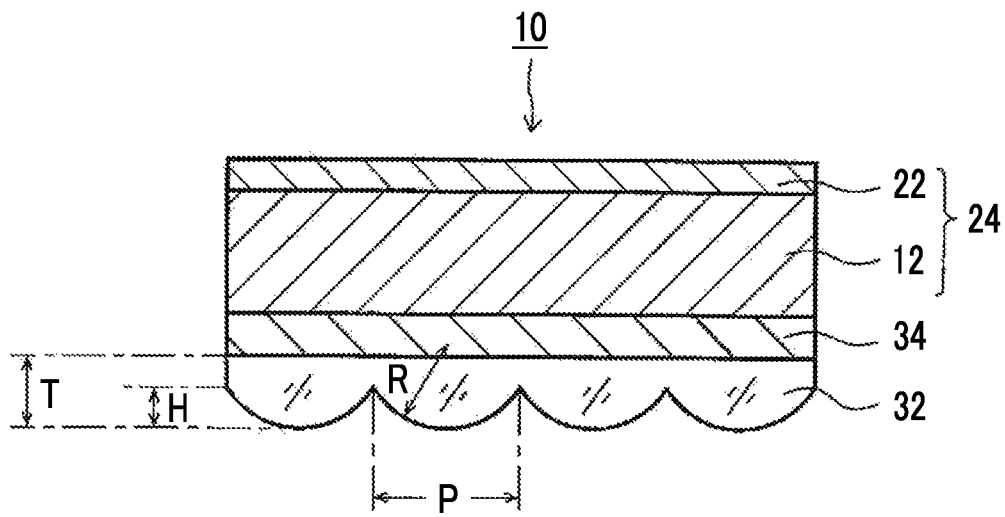
FIG. 1 is schematic cross-sectional view showing an example of a lenticular sheet according to a first embodiment of the present disclosure.

Hereinafter, the embodiments of the present invention will be specifically described, but the present invention is not limited to the embodiments described below.

In the following description of the present specification, "(meth)acrylate" is a comprehensive term that means both of "acrylate" and "methacrylate". "(Meth)acryl" is a comprehensive term that means both of "acryl" and "methacryl".

First Embodiment

A lenticular sheet according to a first embodiment of the present disclosure has a transparent resin substrate stretched in at least one direction, an ink receiving layer provided on one surface side of the transparent resin substrate, and a lenticular lens layer provided on the other surface side of the transparent resin substrate.

Herein, "transparent" in "transparent resin substrate" means that the substrate has a light transmittance of equal to or higher than 70% with respect to at least light (wavelength of equal to or greater than 400 nm and equal to or less than 700 nm) of a visible region.

The lenticular lens layer is a lens layer with a surface on which a large number of columnar convex lenses (hereinafter, simply described as "lenses" in some cases) are disposed in a row.

In the present disclosure, a transparent resin substrate, which is stretched in at least one direction, and an ink receiving layer are manufactured by stretching a transparent resin substrate which is not stretched or stretched in a first direction and on which a coating layer is formed by coating one surface side of the substrate with a coating solution for forming an ink receiving layer.

That is, by coating one surface side of the transparent resin substrate, which is not stretched or stretched in the first direction, with the coating solution for forming an ink receiving layer, a non-stretched laminate having a transparent resin substrate and a coating layer is prepared first. Then, by stretching the prepared non-stretched laminate, a stretched laminate having a transparent resin substrate, which is stretched in at least one direction, and an ink receiving layer is manufactured.

In the manufactured stretched laminate, a lenticular lens layer is formed on a side of the transparent resin substrate that is opposite to the side provided with the ink receiving layer, and in this way, a lenticular sheet according to the first embodiment of the present disclosure is obtained.

Presumably, the lenticular sheet according to the first embodiment of the present disclosure may be excellent in the adhesiveness between the transparent resin substrate and the ink receiving layer for the following reason.

As described above, the lenticular sheet according to the first embodiment of the present disclosure includes the stretched laminate.

In contrast, in the printing medium described in JP2009-58967A or the lenticular sheet described in JP2011-148266A, a surface of a transparent resin substrate is coated with a coating solution for forming an ink receiving layer that is for forming a parallax image by printing or the like, and in this way, a laminate of a transparent resin substrate and an ink receiving layer is prepared. In the printing medium described in JP2009-58967A or the lenticular sheet described in JP2011-148266A, the prepared laminate, that is, the non-stretched laminate is used.

As described above, the lenticular sheet according to the first embodiment of the present disclosure includes the stretched laminate. Accordingly, a lenticular sheet is obtained in which the adhesiveness between the transparent resin substrate and the ink receiving layer is better than in a lenticular sheet of the related art.

The adhesiveness between the transparent resin substrate and the ink receiving layer tends to decrease as the thickness of the lenticular sheet is reduced and within a range of equal to or less than 400 μm, equal to or less than 350 μm, and equal to or less than 200 μm.

However, according to the lenticular sheet of the first embodiment of the present disclosure, even in a case where the thickness of the lenticular sheet is within a range of small thickness, the lenticular sheet has a performance of excellent adhesiveness between the transparent resin substrate and the ink receiving layer.

Furthermore, according to a method for manufacturing a lenticular sheet of the present disclosure, an advantage in that a stretched laminate having a small thickness can be easily manufactured is obtained.

As shown in FIG. 1 which is a schematic cross-sectional view, the lenticular sheet according to the preferred first embodiment of the present disclosure has a stretched laminate 24, a lenticular lens layer 32, and an interlayer 34.

The stretched laminate 24 includes a transparent resin substrate 12 and an ink receiving layer 22. As described above, the stretched laminate 24 is obtained by preparing a non-stretched laminate of a transparent resin substrate and a coating layer by coating one surface side of a transparent resin substrate with a coating solution for forming an ink receiving layer and then stretching the non-stretched laminate. Accordingly, the transparent resin substrate 12 and the ink receiving layer 22 included in the stretched laminate 24 are simultaneously stretched.

<Non-Stretched Laminate>

The non-stretched laminate is prepared by coating one surface side of the transparent resin substrate, which is not stretched or stretched in a first direction, with the coating solution for forming an ink receiving layer such that a coating layer is provided (hereinafter, referred to as a "laminate forming step" as well).

[Transparent Resin Substrate which is not Stretched or Stretched in First Direction]

As the resin used as a material of the transparent resin substrate, which is used in the non-stretched laminate and is not stretched or stretched in the first direction is preferably a resin that transmits the light of a visible region and withstands the heating temperature to which the resin is exposed at the time of forming the lenticular lens layer. Examples of the preferred resin include a polycarbonate, a polysulfone, a polyester such as polyethylene terephthalate or polyethylene naphthalate, a wholly aromatic polyamide, and the like. Particularly, polyethylene terephthalate is preferable because the resin makes it possible to easily form a transparent resin substrate having excellent smoothness.

The transparent resin substrate, which is used in the non-stretched laminate and is not stretched or stretched in the first direction, is manufactured by performing melt extrusion of the aforementioned resin and then performing stretching or the like if necessary. The transparent resin substrate used in the non-stretched laminate is particularly preferably uniaxially stretched polyethylene terephthalate.

The thickness of the transparent resin substrate used in the non-stretched laminate is determined according to a stretching ratio at the time of preparing a stretched laminate. Specifically, for example, the thickness of the transparent resin substrate is preferably within a range of equal to or greater than 25 µm and equal to or less than 250 µm, more preferably within a range of equal to or greater than 50 µm and equal to or less than 250 µm, and particularly preferably within a range of equal to or greater than 100 µm and equal to or less than 250 µm.

[Coating Layer]

One surface side of the aforementioned transparent resin substrate which is not stretched or stretched in the first direction is coated with the coating solution for forming an ink receiving layer such that a coating layer is formed, and in this way, the non-stretched laminate is prepared.

In order to enhance the adhesion between the transparent resin substrate and the ink receiving layer, a corona discharge treatment or the like may be performed in advance on the surface side of the transparent resin substrate that will be coated with the coating solution for forming an ink receiving layer.

[Coating Solution for Forming Ink Receiving Layer]

The coating solution for forming an ink receiving layer contains solid contents forming an ink receiving layer and a coating solvent. The ink receiving layer preferably contains a resin, and at least a portion of the resin is preferably cross-linked by a cross-linking agent. Accordingly, it is preferable that the coating solution for forming an ink receiving layer contains a resin and a cross-linking agent as the solid contents.

In a case where a parallax image is formed particularly by offset printing, it is advantageous for the resin to be at least one resin selected from a polyester, an acrylic resin, and a urethane resin.

Hereinafter, the polyester, the acrylic resin, and the urethane resin will be described.

(Polyester)

The main constituent components of the polyester are, for example, a polyvalent carboxylic acid and a polyvalent hydroxy compound described below. As the polyvalent carboxylic acid, it is possible to use terephthalic acid, isophthalic acid, orthophthalic acid, phthalic acid, 4,4'-diphenyldicarboxylic acid, 2,5-naphthalnenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-sodiumsulfoterephthalic acid, 2-potassiumsulfoterephthalic acid, 4-sodiumsulfoisophthalic acid, 4-potassiumsulfoisophthalic acid, 5-sodiumsulfoisophthalic acid, 5-potassiumsulfoisophthalic acid, adipic acid, azelaic acid, sebacic acid, dodecane dicarboxylic acid, glutaric acid, succinic acid, trimellitic acid, trimesic acid, pyromellitic acid, trimellitic anhydride, pyromellitic dianhydride, phthalic anhydride, p-hydroxybenzoic acid, a trimellitic acid monopotassium salt, ester-forming derivatives of these, and the like. As the polyvalent hydroxy compound, it is possible to use ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, a bisphenol A-ethylene glycol adduct, diethylene glycol, triethylene glycol, polyethylene glycol, polypropylene glycol, polytetramethylene glycol, polytetramethylene oxide glycol, dimethylol propionic acid, glycerin, trimethylolpropane, sodium dimethylol ethyl sulfonate, potassium dimethylol ethyl sulfonate, potassium dimethylol propionate, and the like. Among these compounds, one or more compounds may be appropriately selected, and the polyester may be synthesized by a common polycondensation reaction.

The number-average molecular weight of the polyester is preferably equal to or greater than $5.0 \times 10^3$, more preferably equal to or greater than $8.0 \times 10^3$, and even more preferably equal to or greater than $1.00 \times 10^4$. By making the number-average molecular weight of the polyester fall into the above range, the adhesiveness between the transparent resin substrate and the ink receiving layer in the lenticular sheet is improved.

The number average molecular weight in the present disclosure is, unless otherwise noted, a molecular weight converted with a polystyrene as a standard substance from a value measured by using a gel permeation chromatography (GPC) analyzer equipped with columns of TSKgel GMHxl, TSKgel G4000Hxl and TSKgel G2000HxL (trade names, all manufactured by Tosoh Corp.), with THF (tetrahydrofuran) as eluent liquid, and a differential refractive index meter as a detector, referring to JIS K 7252-1 (2008).

The content rate of the polyester in the ink receiving layer is preferably equal to or higher than 10% by mass and equal to or lower than 80% by mass, more preferably equal to or higher than 15% by mass and equal to or lower than 75% by mass, and even more preferably equal to or higher than 30% by mass and equal to or lower than 65% by mass. By making the content rate of the polyester fall into the above range, the adhesiveness between the transparent resin substrate and the ink receiving layer in the lenticular sheet can be improved.

The glass transition temperature Tg of the polyester contained in the ink receiving layer is preferably lower than 60° C. Herein, the glass transition temperature Tg of the entirety of the polyester contained in the ink receiving layer is more preferably lower than 60° C. Furthermore, the polyester contained in the ink receiving layer is preferably a copolymerized polyester having a naphthalene ring. By using the copolymerized polyester as the resin contained in the ink receiving layer, an ink receiving layer which exhibits excellent adhesiveness with respect to the transparent resin substrate is easily obtained. In addition, if the copolymerized polyester contained in the ink receiving layer has a glass transition temperature Tg of lower than 60° C., an ink receiving layer is formed which is used for printing a parallax image formed on a surface of the ink receiving layer and exhibits excellent adhesiveness with respect, for example, to an offset printing ink. From the viewpoint of the adhesiveness, the glass transition temperature Tg of the copolymerized polyester contained in the ink receiving layer is preferably equal to or lower than 50° C.

The copolymerized polyester contained in the ink receiving layer may be a mixture of two or more kinds of polyesters. In a case where the mixture is used, it is preferable to mix in a polyester having a glass transition temperature Tg of lower than 60° C., because then an ink receiving layer is obtained which is used for printing a parallax image formed on a surface of the ink receiving layer and exhibits excellent adhesiveness with respect, for example, to an offset printing ink. In the copolymerized polyester contained in the ink receiving layer, the concentration of the polyester having a glass transition temperature Tg of lower than 60° C. is preferably equal to or higher than 90% by mass and more preferably equal to or higher than 95% by mass.

If the compound containing a naphthalene ring is used as the copolymerized polyester contained in the ink receiving layer, it is possible to prevent the precipitation of an oligomer within a surface of the ink receiving layer. Presumably, because the oligomer component from the transparent resin substrate is highly compatible with the copolymerized polyester containing a naphthalene ring, the precipitation of the oligomer may be prevented.

The glass transition temperature Tg of the polyester contained in the ink receiving layer is preferably equal to or higher than −20° C. The glass transition temperature Tg of the polyester contained in the ink receiving layer is preferably equal to or higher than −20° C. and equal to or lower than 60° C., and more preferably equal to or higher than −10° C. and equal to or lower than 50° C.

The glass transition temperature Tg is measured based on JIS K 7121 (1987).

The glass transition temperature Tg of the copolymerized polyester having a naphthalene ring tends to be higher than Tg of a copolymerized polyester which does not have a naphthalene ring. Accordingly, among the copolymerized polyesters containing a naphthalene ring, the polyester having a glass transition temperature Tg of lower than 60° C. is preferred as a copolymerized polyester containing the following dicarboxylic acid and diol as copolymerization components.

(Dicarboxylic Acid)

The polyester containing a naphthalene ring preferably has, as a constitutional unit derived from a dicarboxylic acid, a constitutional unit derived from 2,6-naphthalene dicarboxylic acid. Furthermore, among the copolymerized polyesters containing a naphthalene ring, the copolymerized polyester having a glass transition temperature Tg of lower than 60° C. may have, as a constitutional unit of a dicarboxlic acid, a constitutional unit derived from a dicarboxylic acid represented by the following Formula (1), a terephthalic acid, an isophthalic acid, or the like.

  Formula (1)

(in the formula, n represents a natural number of equal to or greater than 4 and equal to or less than 10).

It is preferable that, in the copolymerized polyester containing a naphthalene ring, a proportion X of a constitutional unit derived from 2,6-naphthalene dicarboxylic acid in all of the constitutional units derived from a dicarboxylic acid is equal to or higher than 30% by mass and equal to or lower than 90% by mass, because then an ink receiving layer that exhibits excellent adhesiveness with respect to the transparent resin substrate is obtained. The proportion X is more preferably equal to or higher than 40% by mass and equal to or lower than 80% by mass, and even more preferably equal to or higher than 50% by mass and equal to or lower than 75% by mass.

In order to obtain the copolymerized polyester in which the proportion X is within the above range, a proportion of the dicarboxylic acid containing a naphthalene ring in dicarboxylic acids for preparing the copolymerized polyester is preferably equal to or higher than 30% by mass and equal to or lower than 90% by mass just like the proportion X. The proportion of the dicarboxylic acid containing a naphthalene ring in dicarboxylic acids for preparing the copolymerized polyester is more preferably equal to or higher than 40% by mass and equal to or lower than 80% by mass, and even more preferably equal to or higher than 50% by mass and equal to or lower than 75% by mass.

(Diol)

In the copolymerized polyester, the constitutional unit derived from a diol (hereinafter, referred to as a "diol constitutional unit" as well) is preferably a diol constitutional unit that reduces the glass transition temperature Tg of the copolymerized polyester. Examples of the preferred diol constitutional unit include a diol constitutional unit derived from a diol represented by the following Formula (2) or derived from a diol such as ethylene glycol, diethylene glycol, or triethylene glycol.

  Formula (2)

(in the formula, m represents a natural number of equal to or greater than 4 and equal to or less than 10.)

It is preferable that a proportion Y of the constitutional unit derived from the diol represented by Formula (2) in all of the diol constitutional units contained in the copolymerized polyester is preferably equal to or higher than 10% by mass and equal to or lower than 95% by mass, because then an ink receiving layer is obtained which exhibits excellent adhesion to ink forming an parallax image. The proportion Y is more preferably equal to or higher than 20% by mass and equal to or lower than 90% by mass, and even more preferably equal to or higher than 30% by mass and equal to or lower than 85% by mass.

In order to prepare the copolymerized polyester in which the proportion Y is within the above range, a proportion of the diol represented by Formula (2) in diols for preparing the copolymerized polyester is preferably equal to or higher than 10% by mass and equal to or lower than 95% just like the proportion Y. The proportion of the diol represented by Formula (2) in diols for preparing the copolymerized polyester is more preferably equal to or higher than 20% by mass and equal to or lower than 90% by mass, and even more preferably equal to or higher than 30% by mass and equal to or lower than 85% by mass.

The polyester which can be used in the present disclosure can be obtained as commercial products such as PLASCOAT Z592 and 687 (manufactured by GOO CHEMICAL CO., LTD.).

<Acrylic Resin>

The acrylic resin is a polymer formed of a polymerizable monomer having a carbon-carbon double bond that is represented by a monomer based on acryl or methacryl. The acrylic resin may be a homopolymer or a copolymer. The acrylic resin also includes a copolymer with other polymers (for example, polyester and polyurethane). For example, the acrylic resin is a block copolymer or a graft copolymer. Alternatively, the acrylic resin includes a polymer (a polymer mixture in some cases) obtained by polymerizing a polymerizable monomer having a carbon-carbon double bond in a polyester solution or a polyester dispersion. Furthermore, the acrylic resin also includes a polymer (a polymer mixture in some cases) obtained by polymerizing a polymerizable monomer having a carbon-carbon double bond in a polyurethane solution or a polyurethane dispersion. In addition, the acrylic resin also includes a polymer (a polymer mixture in some cases) obtained by polymerizing a polymerizable monomer having a carbon-carbon double bond in other polymer solutions or dispersions.

The polymerizable monomer having a carbon-carbon double bond is not particularly limited, and examples of particularly typical compounds of the polymerizable monomer include carboxyl group-containing polymerizable monomers such as acrylic acid, methacrylic acid, crotonic acid, itaconic acid, fumaric acid, maleic acid, citraconic acid and polymerizable monomers in which a carboxyl group forms a salt; various hydroxyl group-containing monomers such as 2-hydroxyethyl (meth)acrylate, 2-hydroxypropyl (meth)acrylate, 4-hydroxybutyl (meth)acrylate, monobutyl hydroxyl fumarate, and monobutyl hydroxyitaconate; various (meth)acrylic acid ester such as methyl (meth)acrylate, ethyl (meth)acrylate, propyl (meth)acrylate, butyl (meth) acrylate, and lauryl (meth)acrylate; various nitrogen-containing compounds such as (meth)acrylamide, diacetone acrylamide, N-methylolacrylamide, and (meth)acrylonitrile; various styrene derivatives such as styrene, α-methyl styrene, divinyl benzene, and vinyl toluene, various vinyl esters such as vinyl propionate; various silicon-containing polymerizable monomers such as γ-methacryloxypropyl trimethoxysilane and vinyl trimethoxysilane; phosphorous-containing vinyl-based monomers; various vinyl halides such as vinyl chloride and vinylidene chloride; and various conjugated dienes such as butadiene.

(Urethane Resin)

The urethane resin contained in the ink receiving layer is a generic name of polymers having a urethane bond on a main chain, and is obtained generally by a reaction between a polyisocyanate and a polyol.

Examples of the polyisocyanate include tolylene diisocyanate (TDI), diphenylmethane diisocyanate (MDI), naphthalene diisocyanate (NDI), hexamethylene diisocyanate (HDI), isophorone diisocyanate (IPDI), and the like. Examples of the polyisocyanate also include polymers having an isocyanate group on a terminal thereof that are obtained by performing a chain extension treatment on a polyurethane polymer obtained by a reaction between a polyisocyanate and a polyol such that the molecular weight is increased.

Examples of the polyol include ethylene glycol, propylene glycol, glycerin, hexanetriol, and the like.

The aforementioned polyisocyanate, polyol, and chain extension treatment are described, for example, in "Polyurethane Handbook (edited by Takaharu Ishida, NIKKAN KOGYO SHIMBUM, LTD., published in 1987)". The ink receiving layer may contain one kind of urethane resin or two or more kinds of urethane resins.

The glass transition temperature Tg of the urethane resin contained in the ink receiving layer is preferably equal to or higher than −40° C. and equal to or lower than 50° C., and more preferably equal to or higher than −20° C. and equal to or lower than 40° C. It is preferable that the glass transition temperature Tg of the urethane resin contained in the ink receiving layer is within the above range, because then a parallax image which exhibits excellent adhesiveness with respect to the ink receiving layer is easily formed in a case where an ultraviolet curable-type ink composition is used as ink forming the parallax image, for example.

The urethane resin can be obtained as commercial products such as SUPERFLEX (registered trademark) 150HS and SUPERFLEX 470 (manufactured by DKS Co., Ltd.) and HYDRAN (registered trademark) AP-20, HYDRAN WLS-210, and HYDRAN HW-161 (manufactured by DIC Corporation).

At the time of preparing the stretched laminate by stretching the non-stretched laminate, generally, it is preferable to perform the stretching treatment by heating the non-stretched laminate to a temperature which is equal to or higher than the glass transition temperature (unit: ° C., hereinafter, referred to as "Tg" as well) of the resin as the material of the transparent resin substrate included in the non-stretched laminate and is equal to or lower than Tg+30° C.

In embodiment of the present disclosure, it is preferable to cross-link the resin contained in the ink receiving layer at the aforementioned heating temperature at the time of stretching. Accordingly, it is preferable that the coating solution for forming an ink receiving layer that forms a coating layer by coating the transparent resin substrate contains, as a cross-linking agent, a blocked isocyanate that causes the resin to be cross-linked at the heating temperature at the time of stretching.

(Blocked Isocyanate)

The blocked isocyanate is a compound having a structure obtained by masking an isocyanate group with a blocking agent, and is used as a thermal polymerization-type curing agent. Examples of the blocking agent of the blocked isocyanate include bisulfites, a phenol-based compound such as phenol, cresol, or ethyl phenol, an alcohol-based compound such as propylene glycol monomethyl ether, ethylene glycol, benzyl alcohol, methanol, or ethanol, an active methylene-based compound such as dimethyl malonate, diethyl malonate, methyl acetoacetate, ethyl acetoacetate, or acetyl acetone, a mercaptan-based compound such as butyl mercaptan or dodecyl mercaptan, a lactam-based compound such as ε-caprolactam or 6-valerolactam, an amine-based compound such as diphenylaniline, aniline, ethylenimine, diisopropylamine, diisobutylamine, di(2-butylamine), di(t-butyl)amine, dicyclohexylamine, or N-t-butylcyclohexylamine, acetanilide, an acid amide compound of amide acetate, formaldehyde, and an oxime-based compound such as acetaldoxime, acetone oxime, methyl ethyl ketone oxime, or cyclohexanone oxime. One kind of blocked isocyanate may be used singly, or two or more kinds thereof may be used in combination.

Examples of the isocyanate include an aromatic isocyanate such as tolylene diisocyanate, xylylene diisocyanate, methylene diphenyl diisocyanate, phenylene diisocyanate, or naphthalene diisocyanate, an aromatic ring-containing aliphatic isocyanate such as α,α,α',α'-tetramethylxylylene diisocyanate, an aliphatic isocyanate such as methylene diisocyanate, propylene diisocyanate, lysine diisocyanate, trimethyl hexamethylene diisocyanate, hexamethylene diisocyanate, tetramethylene diisocyanate, pentamethylene diisocyanate, or 2,2,4-trimethyl-1,6-diisocyanatohexane, an alicyclic isocyanate such as cyclohexane diisocyanate, methyl cyclohexane diisocyanate, isophorone diisocyanate, methylene bis(4-cyclohexylisocyanate), isopropylidene dicyclohexyl diisocyanate, 1,3-bis(isocyanatomethyl)-cyclohexane, 4,4'-dicyclohexylmethane diisocyanate, norbornene diisocyanate, or hydrogenated xylylene diisocyanate, and the like. Examples of the isocyanate also include a biuretized isocyanate, an isocyanurated isocyanate, a uretdionized isocyanate, and polymers or derivatives of an isocyanate modified with carbodiimide. One kind of isocyanate may be used singly, or plural kinds thereof may be used in combination. Among the above isocyanates, in order to avoid yellowing caused by ultraviolet rays, an aliphatic isocyanate or an alicyclic isocyanate is more preferred than an aromatic isocyanate.

At the time of forming the ink receiving layer containing the blocked isocyanate, a step of coating the substrate with the coating solution for forming an ink receiving layer and a step of drying (pre-heating portion) of the coating solution are performed. In the step of drying, a group derived from the blocking agent is dissociated from the blocked isocyanate compound. As a result, a urethanization reaction occurs between the isocyanate group (NCO group) derived from the blocked isocyanate compound and a hydroxyl group or the like in the system, and hence the cross-linking density can be improved.

The number-average molecular weight of the blocked isocyanate is preferably equal to or greater than $3.0 \times 10^2$ and equal to or less than $1.00 \times 10^4$. The lower limit of the number-average molecular weight is more preferably $5.0 \times 10^2$, and most preferably $7.0 \times 10^2$. The upper limit of the number-average molecular weight is more preferably $9.0 \times 10^3$, still more preferably $8.5 \times 10^3$, and most preferably $8.0 \times 10^3$.

In a case where the coating solution for forming an ink receiving layer contains the blocked isocyanate, it is preferable that the coating solution contains a first blocked isocyanate and a second blocked isocyanate described below.

<First Blocked Isocyanate>

The first blocked isocyanate is a blocked isocyanate of which 70% gelates at a temperature of equal to or lower than 90° C.

In the preferred first embodiment of the present disclosure, in a case where the uniaxially stretched polyethylene terephthalate film used as the transparent resin substrate of the non-stretched laminate is further stretched (that is, in a case where a stretching treatment is performed for making the non-stretched laminate into a stretched laminate), the temperature (hereinafter, referred to as a "stretching temperature" as well) is within a range of equal to or higher than Tg of the uniaxially stretched polyethylene terephthalate film generally included in the non-stretched laminate and equal to or lower than Tg+30° C. Accordingly, the temperature at which the coating solution for forming an ink receiving layer is generally set to be within a range of equal to or higher than the aforementioned Tg and equal to or lower than Tg+30° C. or within a range of lower than the aforementioned Tg. Specifically, in a case where the stretching temperature is equal to or higher than 80° C. and equal to or lower than 100° C., the drying temperature is preferably about 90° C. If the drying temperature is about 90° C., a block of the first blocked isocyanate contained in the coating solution for forming an isocyanate is dissociated and reacts. As a result, a coat of the cross-linked ink receiving layer can be formed before stretching, and hence the strength of the coating film is enhanced.

The temperature at which 70% of the first blocked isocyanate gelates is lower than a temperature at which 70% of the second blocked isocyanate, which will be described later, gelates. Therefore, the first blocked isocyanate can also be referred to as a low-temperature blocked isocyanate.

The content rate of the first blocked isocyanate is, with respect to the total mass of the ink receiving layer, preferably equal to or higher than 0.1% by mass and equal to or lower than 30% by mass, more preferably equal to or higher than 0.5% by mass and equal to or lower than 20% by mass, and even more preferably equal to or higher than 1% by mass and equal to or lower than 15% by mass. By making the content rate of the first blocked isocyanate fall into the above range, it is possible to effectively improve the adhesiveness between the ink receiving layer and the transparent resin substrate.

As the first blocked isocyanate, for example, at least one of hexamethylene diisocyanate and isophorone diisocyanate is suitably used. As the blocking agent, malonic acid diesters are particularly suitably used as active methylene-based blocking agents. Among these, diethyl malonate and dimethyl malonate are more preferably used. As an amine-based blocking agent, linear secondary amines are suitably used. Among these, diisopropylamine, diisobutylamine, di(2-butylamine), and di(t-butyl)amine are more preferable. It is more preferable to use the active methylene-based blocking agent and the amine-based blocking agent in combination.

<Second Blocked Isocyanate>

The second blocked isocyanate is a blocked isocyanate of which 70% gelates at a temperature of higher than 90° C. The temperature at which 70% of the second blocked isocyanate gelates may be higher than 90° C., and is preferably equal to or higher than 100° C., more preferably equal to or higher than 110° C., and even more preferably equal to or higher than 120° C. The temperature at which 70% of the second blocked isocyanate gelates is higher than the temperature at which 70% of the aforementioned first blocked isocyanate gelates. Therefore, the second blocked isocyanate can also be referred to as a high-temperature blocked isocyanate.

Further, a gel fraction is calculated with the following equation.

$$\text{Gel fraction (\%)} = (We - Wo) \times 100 / (Wd - Wo)$$

Wo represents a weight (g) of a 5 cm×5 cm square substrate.

Wd represents a weight (g) of a 5 cm×5 cm square substrate having a dried ink receiving layer coated film thereon.

We represents a weight (g) of a 5 cm×5 cm square substrate having an ink receiving layer coated film thereon that has undergone acetone immersion treatment.

The acetone immersion treatment is performed such that the 5 cm×5 cm square substrate having the dried ink receiving layer coated film thereon is immersed in 100 ml of acetone 24 hours at 20° C., and thereafter taken out from acetone and dried at room temperature so as to evaporate the acetone.

The content rate of the second blocked isocyanate is, with respect to the total mass of the solid content of the ink receiving layer, preferably within a range of equal to or higher than 0.5% by mass and equal to or lower than 40% by mass, more preferably within a range of equal to or higher than 0.5% by mass and equal to or lower than 30% by mass, and even more preferably within a range of equal to or higher than 0.5% by mass and equal to or lower than 20% by mass. By making the content rate of the second blocked isocyanate fall into the above range, a lenticular sheet excellent in the adhesiveness between the ink receiving layer and the transparent resin substrate is obtained.

As the second blocked isocyanate, for example, hexamethylene diisocyanate and isophorone diisocyanate are suitably used. As the blocking agent, bisulfites, a phenol-based compound, an alcohol-based compound, an active methylene-based compound, a lactam-based compound, an amine-based compound, an oxime-based compound, and the like are preferably used. Particularly, bisulfites are preferably used. Furthermore, at least either a dicarboxylic acid or a diol may have a polyurethane structure or a polyester structure in a molecule.

The total content rate of the first blocked isocyanate and the second blocked isocyanate is, with respect to the total mass of the ink receiving layer, preferably equal to or higher than 0.6% by mass and equal to or lower than 70% by mass, more preferably equal to or higher than 1% by mass and equal to or lower than 50% by mass, and even more preferably equal to or higher than 1.5% by mass and equal to or lower than 35% by mass. By making the total content rate of the first blocked isocyanate and the second blocked isocyanate fall into the above range, the cross-linking density of the ink receiving layer can fall into an appropriate range.

The mass ratio between the first blocked isocyanate and the second blocked isocyanate contained in the ink receiving layer is, represented by a ratio of first blocked isocyanate/second blocked isocyanate, preferably equal to or higher than 1/4 and equal to or lower than 10/1, more preferably equal to or higher than 1/3 and equal to or lower than 10/1, and even more preferably equal to or higher than 1/3 and equal to or lower than 2/1.

The thickness of the coating layer (that is, the layer formed by coating the substrate with the coating solution for forming an ink receiving layer) in the non-stretched laminate is determined according to the stretching ratio at which the non-stretched laminate is stretched to become a stretched laminate. Generally, it is appropriate to select the thickness of the coating layer within a range of equal to or greater than 0.03 µm and equal to or less than 5 µm. The thickness is more preferably within a range of equal to or greater than 0.04 µm and equal to or lower than 2 µm, and particularly preferably within a range of equal to or greater than 0.07 and equal to or lower than 1 µm.

[Cross-Linking Agent]

A cross-linking agent can be incorporated into the coating solution for forming an ink receiving layer. By incorporating the cross-linking agent into the coating solution, at least a portion of the resin contained in the ink receiving layer is cross-linked, and the film hardness of the ink receiving layer is enhanced.

Examples of the cross-linking agent include a melamine compound, an epoxy compound, an oxazoline compound, an isocyanate compound, a carbodiimide compound, and the like.

The cross-linking agent is preferably at least one compound selected from an oxazoline compound, a carbodiimide compound, and an isocyanate compound.

<Oxazoline Compound>

The oxazoline compound is a compound having two or more oxazoline groups in a molecule.

Examples of the oxazoline compound include an oxazoline group-containing polymer such as a polymer which is obtained by, if necessary, copolymerizing an unsaturated polymerizable monomer having an oxazoline group with an unsaturated polymerizable monomer other than the unsaturated polymerizable monomer having an oxazoline group by a known method (for example, solution polymerization or emulsion polymerization). Examples of the unsaturated polymerizable monomer having an oxazoline group include compounds containing, as a monomer unit, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, or 2-isopropenyl-5-methyl-2-oxazoline. The oxazoline compound can be obtained as commercial products such as EPOCROS (registered trademark) K-2020E, EPOCROS K-2010E, EPOCROS K-2020E, EPOCROS K-2030E, EPOCROS WS-300, EPOCROS WS-500, and EPOCROS WS-700 (manufactured by NIPPON SHOKUBAI CO., LTD).

<Carbodiimide Compound>

The carbodiimide compound is a compound having a functional group represented by —N=C=N—. Carbodiimide is generally synthesized by a condensation reaction of an organic diisocyanate. The organic group of the organic diisocyanate used for the synthesis is not particularly limited, and either an aromatic organic group or an aliphatic organic group can be used. Alternatively, a mixture of an aromatic organic group and an aliphatic organic group can also be used. From the viewpoint of reactivity, an aliphatic organic group is particularly preferable. As the raw materials for the synthesis, an organic isocyanate, an organic diisocyanate, an organic triisocyanate, and the like are used.

Specifically, 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, 1,3-phenylene diisocyanate, and the like are used. Furthermore, as an organic monoisocyanate, isophorone isocyanate, phenyl isocyanate, cyclohexyl isocyanate, butyl isocyanate, naphthyl isocyanate, and the like are used. The carbodiimide compound can be obtained as a commercial product such as CARBODILITE (registered trademark) V-02-L2 (manufactured by Nisshinbo Holdings Inc).

<Isocyanate Compound>

The isocyanate compound is a compound having a partial structure represented by —N=C=O. Examples of the organic isocyanate compound include an aromatic isocyanate and an aliphatic isocyanate, and two or more kinds of compounds may be used by being mixed together. Specifically, 4,4'-diphenylmethane isocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, 1,3-phenylene diisocyanate, and the like are used. As an organic monoisocyanate, isophorone isocyanate, phenyl isocyanate, cyclohexyl isocyanate, butyl isocyanate, naphthyl isocyanate, and the like are used. The isocyanate compound can also be obtained as, for example, ERASTRON (registered trademark) H-3 and CAT-21 (all manufactured by DKS Co., Ltd.), DP9C214 (Baxenden Chemicals Ltd.), and TAKENATE (registered trademark) WD-HS30 (manufactured by Mitsui Chemicals, Inc).

The amount of the cross-linking agent incorporated into the coating solution is, based on the total mass of the resin contained in the ink receiving layer, preferably within a range of equal to or greater than 3% by mass and equal to or less than 30% by mass, and more preferably within a range of equal to or greater than 3% by mass and equal to or less than 20% by mass.

By incorporating the cross-linking agent into the coating solution in an amount of equal to or greater than 3% by mass with respect to the resin, the adhesiveness between the ink receiving layer and the transparent resin substrate is improved, and the film hardness of the ink receiving layer is enhanced. Furthermore, the adhesiveness between the ink receiving layer and, for example, an offset printing ink used in a case where a parallax image is printed is also improved.

A surfactant, a lubricant, organic or inorganic particles, a pH adjuster, and the like can be incorporated into the coating solution for forming an ink receiving layer.

The coating solution for forming an ink receiving layer containing a surfactant brings about an effect of improving coating properties in a case where one surface side of the transparent resin substrate is coated with the coating solution for forming an ink receiving layer.

In the ink receiving layer containing a lubricant, for example, an offset printing ink which is for forming a parallax image on a surface of the ink receiving layer hardly bleeds on the surface of the ink receiving layer. Therefore, the resolution of the parallax image formed on the ink receiving layer containing a lubricant is higher than the resolution of a parallax image formed on an ink receiving layer which does not contain a lubricant.

The ink receiving layer containing inorganic particles has higher film strength compared to an ink receiving layer which does not contain inorganic particles.

The coating solution for forming an ink receiving layer containing a pH adjuster exhibits excellent stability as a coating solution. Therefore, in a case where the lenticular sheet according to the present disclosure is manufactured, the manufacturing suitability is improved.

[Surfactant]

Examples of the surfactant include a known anionic surfactant, nonionic surfactant, cationic surfactant, fluorine-based surfactant, and silicone-based surfactant. The surfactant is described, for example, in "Surfactant Handbook" (edited by Ichiro Nishi, Tomoichiro Imai, and Shozo Kasai, Sangyo Tosho Co., Ltd., published in 1960).

As the surfactant incorporated into the coating solution for forming an ink receiving layer, either or both of an anionic surfactant and a nonionic surfactant are particularly preferable because these surfactants bring about an excellent effect of improving coating properties.

Examples of the anionic surfactant include a higher fatty acid salt such as potassium stearate or potassium behenate, an alkyl ether carboxylate such as sodium polyoxyethylene (hereinafter, abbreviated to "POE") lauryl ether carboxylate, N-acyl-L-glutamate such as monosodium N-stearoyl-L-glutamate, a higher alkyl sulfuric acid ester salt such as sodium lauryl sulfate or potassium lauryl sulfate, an alkyl ether sulfuric acid ester salt such as triethanolamine POE lauryl sulfate or sodium POE lauryl sulfate, N-acyl sarcosinate such as sodium lauroyl sarcosinate, a higher fatty acid amide sulfonate such as sodium N-myristoyl-N-methyl taurate, alkyl phosphate such as sodium stearyl phosphate, alkyl ether phosphate such as sodium POE oleyl ether phosphate or sodium POE stearyl ether phosphate, sulfosuccinate such as sodium di-2-ethylhexylsulfosuccinate, sodium monolauroyl monoethanolamide polyoxyethylene sulfosuccinate, or sodium lauroyl polypropylene glycol sulfosuccinate, alkyl benzene sulfonate such as sodium linear dodecyl benzene sulfonate, linear dodecyl benzene, triethanolamine sulfonate, linear dodecyl benzene sulfonate, or dodecyl diphenyl ether disulfonate, and a higher fatty acid ester sulfuric acid ester salt such as hydrogenated coconut oil fatty acid glycerin sodium sulfate.

Examples of commercially available anionic surfactants include RAPISOL (registered trademark) A-90, RAPISOL A-80, RAPISOL BW-30, RAPISOL B-90, and RAPISOL C-70 (manufactured by NOF CORPORATION), NIKKOL (registered trademark) OTP-100 (manufactured by Nikko Chemicals Co., Ltd.), KOHACOOL (registered trademark) ON (manufactured by TOHO Chemical Industry Co., Ltd.), KOHACOOL L-40 (manufactured by TOHO Chemical Industry Co., Ltd.), PHOSPHANOL (registered trademark) 702 (manufactured by TOHO Chemical Industry Co., Ltd.), BEAULIGHT (registered trademark) A-5000, BEAULIGHT SSS, SANDEDDO (registered trademark) BL (manufactured by Sanyo Chemical Industries, Ltd.), and the like.

Examples of the cationic surfactant include an alkyl trimethyl ammonium salt such as stearyl trimethyl ammonium chloride or lauryl trimethyl ammonium chloride, a dialkyl dimethyl ammonium salt such as distearyl dimethyl ammonium chloride, an alkyl pyridinium salt such as poly (N,N-dimethyl-3,5-methylene piperidinium) chloride or cetylpyridinium chloride, a tetraalkyl ammonium salt, an alkyl dimethyl benzyl ammonium salt, an alkyl isoquinolinium salt, a dialkyl morpholinium salt, POE alkylamine, an alkylamine salt, a polyamine fatty acid derivative, an amyl alcohol fatty acid derivative, benzalkonium chloride, and benzethonium chloride. The use of these surfactants inhibit the aggregation of particles in the process of drying the coat and makes it possible to form uniform surface irregularities.

Examples of commercially available cationic surfactants include a phthalocyanine derivative (trade name: EFKA-745, manufactured by MORISHITA & CO., LTD.), an organosiloxane polymer KP 341 (manufactured by Shin-Etsu Chemical Co., Ltd.), a (meth)acrylic acid-based (co) polymer POLYFLOW No. 75, No. 90, and No. 95 (manufactured by KYOEISHA CHEMICAL Co., LTD), W001 (manufactured by Yusho Co., Ltd.), and the like.

Examples of commercially available nonionic surfactants include NAROACTY (registered trademark) CL-95 and HN-100 (manufactured by Sanyo Chemical Industries, Ltd.), RISOREX (registered trademark) BW400 (manufactured by KOKYU ALCOHOL KOGYO CO., LTD.), EMALEX (registered trademark) ET-2020 (NIHON EMULSION Co., Ltd.), UNILUB (registered trademark) 50 MB-26 and NONION IS-4 (NOF CORPORATION), and the like.

In a case where a surfactant is incorporated into the coating solution for forming an ink receiving layer, the amount of the surfactant is, based on the total mass of the solid content of the resin, preferably equal to or less than 0.5% by mass and equal to or less than 5.0% by mass, and more preferably equal to or greater than 0.5% by mass and equal to or less than 3.0% by mass.

[Lubricant]

As the lubricant, aliphatic wax or the like is suitably used.

Specific examples of the aliphatic wax include vegetable wax such as carnauba wax, candelilla wax, rice wax, japan wax, jojoba oil, palm wax, rosin-modified wax, ouricury wax, sugar cane wax, esparto wax, and bark wax, animal wax such as beeswax, lanolin, spermaceti, insect wax, and shellac wax, mineral wax such as montan wax, ozokerite, and ceresin wax, petroleum-based wax such as paraffin wax, microcrystalline wax, and petrolatum, and synthetic hydrocarbon-based wax such as Fischer-Tropsch wax, polyethylene wax, oxidized polyethylene wax, polypropylene wax, and oxidized polypropylene wax. Among these, carnauba wax, paraffin wax, and polyethylene wax are particularly preferable.

The lubricant can also be used as an aqueous dispersion because then the environmental load can be reduced and the handling of the lubricant becomes easy. Examples of commercially available lubricants include SELOSOL (registered trademark) 524 (manufactured by CHUKYO YUSHI CO., LTD.), and the like.

One kind of lubricant may be used singly, or two or more kinds thereof may be used in combination.

The content rate of the lubricant is, based on the total mass of the solid content of the ink receiving layer, preferably equal to or higher than 0.005% by mass and equal to or lower than 10% by mass, and more preferably equal to or higher than 0.01% by mass and equal to or lower than 5% by mass.

Examples of the inorganic particles include silica, calcium carbonate, magnesium oxide, magnesium carbonate, and the like.

Examples of the organic particles include polystyrene particles and polymethyl methacrylate particles. From the viewpoint of a slipperiness improving effect and costs, polystyrene particles, polymethyl methacrylate particles, and silica are preferable.

The content rate of the inorganic particles is, based on the total mass of the solid content of the ink receiving layer, preferably equal to or higher than 0.005% by mass and equal to or lower than 10% by mass, and more preferably equal to or higher than 0.01% by mass and equal to or lower than 10% by mass.

[Interlayer]

An interlayer containing a resin may be provided between the transparent resin substrate and the ink receiving layer. By providing the interlayer, the adhesiveness between the transparent resin substrate and the ink receiving layer can be improved.

Examples of the resin contained in the interlayer include an ethylene-vinyl alcohol copolymer, a modified polyethylene, a modified polyolefin such as modified polypropylene, and the like.

The modified polyolefin is on the market in the name of, for example, ADMER (registered trademark) from Mitsui Chemicals, Inc.

The interlayer may be provided on a surface of the transparent resin substrate by an appropriate method according to the properties of the resin. For example, the interlayer may be formed by coating a surface of the transparent resin substrate with a solution obtained by dissolving the resin in a solvent or with a dispersion obtained by dispersing the resin in a solvent. In a case where the resin is a hot-melt resin, the interlayer may be formed by melt-extruding the resin onto a surface of the transparent resin substrate.

<Stretched Laminate>

The stretched laminate is prepared by stretching the aforementioned non-stretched laminate.

The laminate stretching step of stretching the non-stretched laminate so as to prepare a stretched laminate is a step including a uniaxial stretching process of stretching the non-stretched laminate in one direction, and may be a step including a biaxial stretching process of stretching the non-stretched laminate in directions orthogonal to each other.

In a particularly preferred aspect of the present disclosure, the transparent resin substrate included in the non-stretched laminate is a uniaxially stretched film stretched in a first direction, and the non-stretched laminate is stretched such that at least one of the stretching directions along which the non-stretched laminate is stretched becomes orthogonal to the first direction of the uniaxially stretched film.

In a case where the stretched laminate is prepared form the non-stretched laminate, it is appropriate for the stretching ratio to be set such that the laminate is stretched by a factor of equal to or greater than 1.5 and equal to or less than 7. The stretching ratio is preferably set such that the laminate is stretched by a factor of equal to or greater than 1.7 and equal to or less than 5, and is more preferably set such that the laminate is stretched by a factor of equal to or greater than 2 and equal to or less than 4. By setting the stretching ratio such that the laminate is stretched by a factor of equal to or greater than 1.5 and equal to or less than 7, the mechanical strength becomes sufficient, the thickness becomes excellently uniform, and a lenticular sheet is easily obtained which is excellent in the adhesiveness between the transparent resin substrate and the ink receiving layer.

In a case where the transparent resin substrate included in the non-stretched laminate is a uniaxially stretched film, it is advantageous to adopt the stretching direction of the uniaxially stretched film as a Machine Direction (MD) and the stretching direction along which the non-stretched laminate is stretched as a Transverse Direction (TD), because then a degree of freedom for manufacturing is heightened.

A lenticular lens layer is provided on a side of the obtained stretched laminate that is opposite to the side provided with the ink receiving layer, and in this way, a lenticular sheet according to the first embodiment of the present disclosure is obtained.

It is appropriate for the thickness of the transparent resin substrate in the stretched laminate to be selected within a range of equal to or greater than 50 μm and equal to or less than 300 μm. The thickness of the transparent resin substrate is more preferably within a range of equal to or greater than 60 μm and equal to or less than 300 μm, and particularly preferably within a range of equal to or greater than 100 μm and equal to or less than 300 μm.

It is appropriate for the thickness of the ink receiving layer in the stretched laminate to be selected within a range of equal to or greater than 0.01 μm and equal to or less than 1 μm. The thickness of the ink receiving layer is more preferably within a range of equal to or greater than 0.02 μm and equal to or less than 0.1 μm, and particularly preferably within a range of equal to or greater than 0.04 μm and equal to or less than 0.07 μm.

<Lenticular Lens Layer>

In the stretched laminate, on a surface of the transparent resin substrate that is opposite to the surface side provided with the ink receiving layer, a lenticular lens layer (hereinafter, simply referred to as a "lens layer" as well) is formed. The step of forming the lenticular lens layer on the transparent resin substrate will be referred to as a "lenticular lens layer forming step" as well.

As shown in FIG. 1, regarding the lens layer, it is preferable that a lenticular lens layer 32 is provided through an interlayer 34.

For the lens layer 32 and the interlayer 34, it is preferable to use a method in which a resin for forming the interlayer 34 and a resin for forming the lens layer 32 are melted and co-extruded onto a surface of the transparent resin substrate that is opposite to the surface provided with the ink receiving layer in the stretched laminate, and then a surface of the resin for forming the lens layer 32 is embossed using an embossing roller such that the lens layer is formed.

Furthermore, the interlayer 34 may be formed by a method in which, at the time of preparing the non-stretched laminate, a coating layer is formed on a surface side of the transparent resin substrate, which is not stretched or stretched in the first direction, opposite to the side on which the ink receiving layer is formed, and then the obtained non-stretched laminate having a coating layer on both surfaces of the transparent resin substrate, which is not stretched or stretched in the first direction, is stretched.

Examples of the resin for forming the lens layer 32 include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, a cycloolefin polymer, and the like. Considering the ease of melt extrusion, it is preferable to use a resin having low melt viscosity, such as a polymethyl methacrylate resin (PMMA), a polycarbonate resin, a polystyrene resin, a methacrylate-styrene copolymer resin (MS resin), a polyethylene resin, a polyethylene terephthalate resin, or a glycol-modified polyethylene terephthalate resin. It is more preferable to use a glycol-modified polyethylene terephthalate resin, because the lens shape formed on the surface of the embossing roller are easily transferred to this resin, and the lens layer does not easily crack at the time of embossing.

As the polyethylene terephthalate (PET) resin, amorphous PET may be used.

The lens layer 32 may contain a plurality of resins.

The lens layer 32 has a thickness (T in FIG. 1) of equal to or greater than 50 µm and equal to or less than 200 µm, and the surface of the lens layer 32 has a lenticular lens shape in which a plurality of columnar convex lenses is disposed in a row. For example, the lenticular lens shape is formed such that a lens radius (R in FIG. 1) becomes equal to or greater than 100 and equal to or less than 200 µm, a lens height (H in FIG. 1) becomes equal to or greater than 50 µm and equal to or less than 100 µm, and a lens pitch (P in FIG. 1) becomes equal to or greater than 100 µm and equal to or less than 257 µm. Here, the present invention is not limited to the above numerical values, and for example, the lens pitch P may be 127 µm or 254 µm. The lenticular lens shape means a plate-like lens array in which the shapes obtained when columns are cut lengthwise are lined up in parallel, that is, the shape in which columnar lenses are two-dimensionally arrayed.

[Interlayer]

The interlayer 34 may be provided between the transparent resin substrate 12 and the lens layer 32. In a case where a resin material constituting the lens layer 32 exhibits adhesiveness with respect to the transparent resin substrate 12, it is not necessary to provide the interlayer 34.

It is preferable that the interlayer 34 contains at least a resin. As the resin forming the interlayer 34, a thermoplastic resin that results in excellent adhesiveness between the lens layer 32 and the transparent resin substrate 12 is preferable.

Examples of the preferred thermoplastic resin forming the interlayer 34 include an ethylene-vinyl alcohol copolymer, a modified polyethylene, a modified polyolefin such as a modified polypropylene, a polyester, an acrylic resin, a urethane resin, and the like.

The thickness of the interlayer 34 is preferably equal to or greater than 0 µm and equal to or less than 10 µm, and more preferably equal to or greater than 0 µm and equal to or less than 0.1 µm.

Next, a method will be described by which each of the interlayer 34 and the lens layer 32 is formed on a surface of the transparent resin substrate that is opposite to the side provided with the ink receiving layer 22 in the stretched laminate 24.

It is preferable that the aforementioned method includes a step of co-extruding a first thermoplastic resin for forming the interlayer 34 and a second thermoplastic resin for forming the lens layer 32 onto the side of the transparent resin substrate 12 that is opposite to the side provided with the ink receiving layer 22, and a step of clamping the stretched laminate provided with the layers of the co-extruded first thermoplastic resin and the second thermoplastic resin between an embossing roller, which is disposed to face the second thermoplastic resin side and has molds for forming lenses, and a nip roller, which is disposed to face the ink receiving layer 22 side of the transparent resin substrate 12, and processing the surface of the second thermoplastic resin layer such that lenses are formed.

The interlayer 34 may be provided in advance on a side of the transparent resin substrate 12 that is opposite to the side provided with the ink receiving layer 22 in the stretched laminate 24. That is, if the aforementioned method includes a laminate forming step of forming a laminate having a transparent resin substrate and a coating layer on both surfaces of the transparent resin substrate by coating one surface side of a transparent resin substrate, which is not stretched or stretched in a first direction, with a coating solution for forming an ink receiving layer and coating the other surface side of the transparent resin substrate with a coating solution for forming an interlayer, and a laminate stretching step of stretching the laminate such that an ink receiving layer is formed on one surface side of the transparent resin substrate which is stretched in at least one direction and that an interlayer is formed on the other surface side of the transparent resin substrate which is stretched in at least one direction, a stretched laminate can be prepared, and a lens layer can be formed on the interlayer of the prepared stretched laminate.

On the surface of the embossing roller, for example, inverted shapes for forming lenticular lens shapes are formed. The laminate layer consisting of two layers of the first thermoplastic resin and the second thermoplastic resin co-extruded onto the surface of the transparent resin substrate of the stretched laminate is clamped between the embossing roller and the nip roller, and the inverted shapes of lenses formed on the surface of the embossing roller are transferred onto the surface of the laminate layer of the second thermoplastic resin. The laminate layer of the second thermoplastic resin to which the lenticular lens shapes are transferred is cooled and solidified while being wound around the embossing roller. Then, by peeling the stretched laminate having the laminate layer consisting of two layers of the first thermoplastic resin and the second thermoplastic resin from the embossing roller, the lenticular lens layer 32 having lenticular lenses is formed on the surface of the laminate layer of the second thermoplastic resin, and a lenticular sheet according to the first embodiment of the present disclosure is obtained.

As the material of the embossing roller, it is possible to adopt various steel members, stainless steel, copper, zinc, brass, the materials obtained by plating these metal materials used as a core with hard chrome (HCr plating), Cu, or Ni, ceramics, and various composite materials.

The nip roller is a roller which is disposed to face the embossing roller and used for clamping the resin layer, the transparent resin substrate, and the transparent thermoplastic resin in cooperation with the embossing roller. As the material of the nip roller, it is possible to adopt various steel members, stainless steel, copper, zinc, brass, and the materials obtained by lining the surface of these metal materials used as a core with rubber.

The temperature of the embossing roller is set such that the temperature of the second thermoplastic resin becomes equal to or higher than the glass transition temperature in the clamped portion, such that the second thermoplastic resin laminate layer is not cooled and solidified before patterns are completely transferred to the laminate layer.

It is appropriate for the thickness of the lenticular sheet according to the first embodiment of the present disclosure to be within a range of equal to or greater than 30 μm and equal to or less than 400 μm. According to the present disclosure, it is possible to easily obtain a thin lenticular sheet which is manufactured with a relatively high level of difficulty in terms of the mechanical strength or image recognizability, for example, a lenticular sheet having a thickness within a range of equal to or greater than 100 μm and equal to or less than 200 μm.

—Method for Manufacturing Lenticular Sheet—

A first aspect of the method for manufacturing a lenticular sheet according to the first embodiment of the present disclosure includes a laminate forming step of forming a laminate of a transparent resin substrate and a coating layer by coating one surface side of a transparent resin substrate, which not stretched or stretched in a first direction, with a coating solution for forming an ink receiving layer, a laminate stretching step of stretching the laminate such that an ink receiving layer is formed on one surface side of the transparent resin substrate which is stretched in at least one direction, and a lenticular lens layer forming step of forming a lenticular lens layer on a side of the transparent resin substrate, which is stretched in at least one direction in the laminate stretching step, opposite to the side provided with the ink receiving layer.

A second aspect of the method for manufacturing a lenticular sheet according to the first embodiment of the present disclosure includes a laminate forming step of forming a laminate having a transparent resin substrate and a coating layer on both surfaces of the transparent resin substrate by coating one surface side of a transparent resin substrate, which is not stretched or stretched in a first direction, with a coating solution for forming an ink receiving layer and coating the other surface side of the transparent resin substrate with a coating solution for forming an interlayer, a laminate stretching step of stretching the laminate such that an ink receiving layer is formed on one surface side of the transparent resin substrate stretched in at least one direction and that an interlayer is formed on the other surface side of the transparent resin substrate stretched in at least one direction, and a lenticular lens layer forming step of forming a lenticular lens layer on the interlayer formed on a side of the transparent resin substrate, which is stretched in at least one direction in the laminate stretching step, opposite to the side provided with the ink receiving layer.

The coating solution for forming an ink receiving layer contains the respective components contained in the ink receiving layer and a coating solvent.

<Coating Solvent>

As the coating solvent of the coating solution for forming an ink receiving layer, it is possible to use water or an organic solvent such as a glycol-based solvent or an ether-based solvent.

The method for coating one surface of the transparent resin substrate with the coating solution for forming an ink receiving layer includes bar coating (bar coating method), slit coating, spray coating, spin coating, and the like.

The details of the laminate forming step, the laminate stretching step, and the lenticular lens layer forming step in the method for manufacturing a lenticular sheet according to the first embodiment of the present disclosure are as described above.

As the method for forming a parallax image on the surface of the ink receiving layer of the lenticular sheet according to the first embodiment of the present disclosure, an offset printing method which makes it easy to print a high-definition parallax image is preferable.

The ink composition used for offset printing is not particularly limited as long as the composition is known composition. Examples of the ink composition include a general oxidative polymerization-type ink composition that is oxidized due to oxygen in the air, an ultraviolet curable-type ink composition that is cured by being irradiated with active rays, a solventless ultraviolet curable-type ink composition which does not contain a solvent, and the like.

Examples of commercial ink compositions include a WEB WORLD (registered trademark) series, a WEB ZETT (registered trademark) series, a DAICURE (registered trademark) series (all manufactured by DIC Graphics Corporation), and the like.

The method for forming a parallax image on the surface of the ink receiving layer is not limited to the offset printing, and even with ink jet printing, a high-definition parallax image can also be formed.

Second Embodiment

A lenticular sheet according to a second embodiment of the present disclosure has a transparent resin substrate, a first ink receiving layer provided to contact one surface of the transparent resin substrate, a second ink receiving layer provided on a side of the first ink receiving layer that is opposite to the transparent resin substrate side, and a lenticular lens layer provided on the other surface side of the transparent resin substrate, in which the first ink receiving layer is a layer of which the adhesiveness with respect to the transparent resin substrate is higher than the adhesiveness of the second ink receiving layer with respect to the transparent resin substrate, and the second ink receiving layer is a layer of which the adhesiveness with respect to ink is higher than the adhesiveness of the first ink receiving layer with respect to ink.

Hereinafter, the lenticular sheet according to the second embodiment will be specifically described. In the following section, the same contents which have already been explained regarding the lenticular sheet according to the first embodiment will not be described in some cases.

Figure 2:
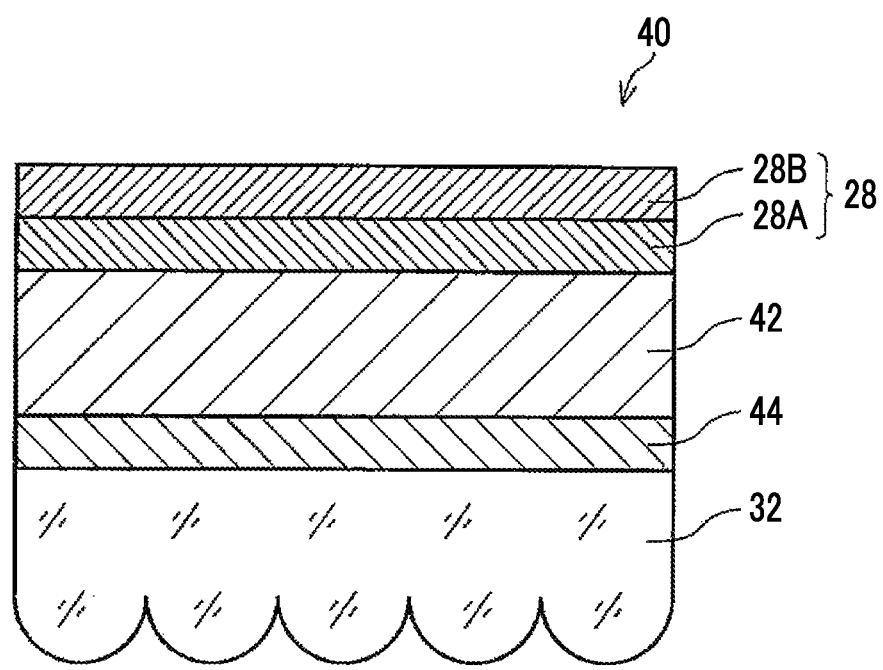
FIG. 2 is a schematic cross-sectional view showing an example of a lenticular sheet according to a second embodiment of the present disclosure.

As schematically shown in FIG. 2, the lenticular sheet according to the second embodiment of the present disclosure has a transparent resin substrate 42, a first ink receiving layer 28A provided to contact one surface of the transparent resin substrate 42, a second ink receiving layer 28B provided on a side of the first ink receiving layer 28A that is opposite to the transparent resin substrate 42 side, and a lenticular lens layer 32 provided on the other surface side of the transparent resin substrate 42. The first ink receiving layer 28A Is a layer of which the adhesiveness with respect to the transparent resin substrate 42 is higher than the adhesiveness of the second ink receiving layer 28B with respect to the transparent resin substrate 42, and the second ink receiving layer 28B is a layer of which the adhesiveness with respect to ink is higher than the adhesiveness of the first ink receiving layer 28A with respect to ink. In a lenticular sheet 40 shown in FIG. 2, an interlayer 44 is provided between the transparent resin substrate 42 and the lenticular lens layer 32 as in a lenticular sheet 10 shown in FIG. 1.

[Transparent Resin Substrate]

As the transparent resin substrate in the lenticular sheet according to the second embodiment, it is possible to use a non-stretched film, a uniaxially stretched film, or a biaxially stretched film. From the viewpoint of the manufacturing costs, the inhibition of thermal deformation, the thickness of the substrate, the strength of the substrate, and the like, the transparent resin substrate is preferably a biaxially stretched film and more preferably a biaxially stretched polyethylene terephthalate film.

The constituent material, the thickness, and the like of the transparent resin substrate used in the second embodiment are the same as the constituent material, the thickness, and the like of the transparent resin substrate included in the lenticular sheet according to the first embodiment.

<First Ink Receiving Layer and Second Ink Receiving Layer>

On one surface side of the transparent resin substrate, as an ink receiving layer, a first ink receiving layer and a second ink receiving layer are provided in this order from the transparent resin substrate side by being laminated on each other. The first ink receiving layer is constituted with a layer of which the adhesiveness with respect to the transparent resin substrate is higher than the adhesiveness of the second ink receiving layer with respect to the transparent resin substrate. The second ink receiving layer is constituted with a layer of which the adhesiveness with respect to ink is higher than the adhesiveness of the first ink receiving layer with respect to ink. Because the first ink receiving layer of which the adhesiveness with respect to the transparent resin substrate is higher than the adhesiveness of the second ink receiving layer is provided in a state of contacting the transparent resin substrate, it is possible to make the entire ink receiving layer secure high adhesiveness with respect to the transparent resin substrate. Meanwhile, on a surface of the first ink receiving layer that is opposite to the transparent resin substrate side, the second ink receiving layer of which the adhesiveness with respect to ink (for example, an ultraviolet curable-type ink composition) forming a parallax image is higher than the adhesiveness of the first ink receiving layer with respect to ink is provided. Accordingly, at the time of forming a parallax image on the surface of the second ink receiving layer by using the ink, high ink adhesiveness can be secured.

The materials constituting the first ink receiving layer and the second ink receiving layer may be selected according to the transparent resin substrate and the ink to be used. For example, the materials may be each selected from the resin, the cross-linking agent, the surfactant, the lubricant, and the like used for forming the ink receiving layer in the lenticular sheet according to the first embodiment. Specifically, it is preferable that the first ink receiving layer and the second ink receiving layer each independently contain at least one resin, which is selected from a polyester, an acrylic resin, and a urethane resin, and a cross-linking agent.

The thickness of the first ink receiving layer and the second ink receiving layer is not particularly limited. From the viewpoint of the adhesiveness with respect to the transparent resin substrate or ink, the uniformity of the film thickness, and the like, the thickness of each of the first and second ink receiving layers is preferably within a range of 0.02 to 1.5 μm, for example.

A third ink receiving layer may be additionally provided between the first ink receiving layer and the second ink receiving layer.

<Lenticular Lens Layer>

In the lenticular sheet according to the second embodiment, on the other surface side of the transparent resin substrate, that is, on the side of the transparent resin substrate that is opposite to the side provided with the first ink receiving layer, a lenticular lens layer (lens layer) in which convex lenses (lenses) are lined up in a row is provided.

The constituent material, the thickness, and the like of the lens layer are the same as those of the lenticular lens layer in the first embodiment.

As in the first embodiment, it is preferable that the lens layer is provided on the transparent resin substrate through an interlayer.

The constituent materials, the thickness, and the like of the interlayer are the same as those of the interlayer in the first embodiment.

—Method for Manufacturing Lenticular Sheet According to Second Embodiment—

The method for manufacturing a lenticular sheet according to the second embodiment of the present disclosure includes a first ink receiving layer forming step of forming a first ink receiving layer by coating one surface side of a transparent resin substrate with a coating solution for forming a first ink receiving layer, a second ink receiving layer forming step of forming a second ink receiving layer by coating the surface of the ink receiving layer with a coating solution for forming a second ink receiving layer, and a lenticular lens layer forming step of forming a lenticular lens layer on the other surface side of the transparent resin substrate, that is, on a side opposite to the surface on which the first ink receiving layer is formed.

The method for manufacturing a lenticular sheet according to the second embodiment of the present disclosure may include an interlayer forming step of forming an interlayer by coating the other surface side of the transparent resin substrate with a coating solution for forming an interlayer, before the lenticular lens layer forming step.

In a case where the second ink receiving layer is formed after the first ink receiving layer, and then the interlayer is formed, the lenticular lens layer needs to be formed after the interlayer is formed. However, the order of the first ink receiving layer forming step and the interlayer forming step and the order of the second ink receiving layer forming step and the interlayer forming step are not particularly limited.

For example, each layer may be formed through steps performed in order of the first ink receiving layer forming step, the interlayer forming step, the second ink receiving layer forming step, and the lenticular lens layer forming step. Furthermore, the steps of forming each layer on both surface sides of the transparent resin substrate may be simultaneously performed. For example, the step of forming any one of the first ink receiving layer and the second ink receiving layer and the step of forming any one of the interlayer and the lenticular lens layer may be simultaneously performed.

—Lenticular Display Body—

In the lenticular display body according to the present disclosure, on the surface of the ink receiving layer of the lenticular sheet according to the first embodiment or on the surface of the second ink receiving layer of the lenticular sheet according to the second embodiment, an image layer including a parallax image (hereinafter, described as a "lenticular image" in some cases) is provided.

The parallax image in the lenticular display body of the present disclosure is not particularly limited, and may be formed according to the image to be displayed (parallax image for display). Generally, for each of the lenses arrayed on the display side of the lenticular lens layer, along the lens array direction of the lenticular lens layer, two or more kinds of (plural kinds of) parallax images for display are arrayed (hereinafter, belt-like images which are disposed in a direction parallel to the longitudinal direction of the lenses and constitute the parallax images for display will be referred to as an "image column" in some cases).

In the lenticular sheet according to the present disclosure, a high-definition image can be formed on the ink receiving layer. Therefore, for example, in a case where a lenticular display body in which character information is changed is manufactured, the lenticular sheet can be suitably used. As an example of the lenticular display body according to the present disclosure, a case where the character information is independently displayed in a plurality of languages will be specifically described.

The lenticular display body according to the present embodiment has a lenticular lens layer and a lenticular image containing character information which is each independently displayed in a plurality of languages. The lenticular display body is constituted such that, when the lenticular image is observed through the lenticular lens layer, the languages displaying the character information are switched according to the observation angle.

The lenticular display body according to the present embodiment has a constitution in which the display languages are switched as the observation angle is changed. Therefore, compared to the general business cards using one language, the lenticular display body can contain more information displayed by a plurality of languages, but nevertheless, it is not necessary to reduce the size of the characters of each language or to increase the size of the recording medium itself. Accordingly, for example, even if the lenticular display body has a small display surface just like a business card, it can display character information in a plurality of languages with high readability.

Furthermore, in a single sheet of the lenticular display body according to the present embodiment, the display languages can be switched with each other according to the observation angle. Therefore, the lenticular display body is not bulky unlike a book, does not require an electronic medium such as a liquid crystal panel or a power source, can be used in any place without limitation, and can be manufactured at low costs. Accordingly, the lenticular display body according to the present embodiment can also be suitably used, for example, as a small-sized display body that will be handed to another person just like a business card or carried by being put into a pocket or the like of clothes.

Hereinafter, as an example of the lenticular display body according to the present embodiment, a business card will be described. The lenticular display body according to the present embodiment is not limited to the business card, and can be used in other forms without particular limitation as long as it is a display body containing character information.

FIG. 3 is a schematic view showing a business card (hereinafter, described as a "lenticular business card" in some cases) 50 as an example of the lenticular display body according to the present embodiment. Generally, a business card contains character information such as the full name of a user, the name of an organization to which the user belongs, the title, the address, the phone number, the FAX number, the E-mail address, and URL. The lenticular business card 50 shown in FIG. 3 is constituted such that three languages (a first language, a second language, and a third language) are switched with each other according to the observation angle.

Hereinafter, the constitution of the lenticular display body according to the present embodiment will be specifically described.

(Lenticular Lens Layer)

The lenticular display body according to the present embodiment uses, as a lenticular sheet, the lenticular sheet according to the first embodiment or the second embodiment described above.

In the present embodiment, the width of each lens constituting the lenticular lens layer is not particularly limited, and a pitch width of the lens may be selected according to the purpose. Generally, in many cases, Line Per Inch (LPI) showing the number of lenses per inch (2.54 cm) is used. 100 LPI shows that there are 100 rows (100 lines) of lenses per inch, and a pitch of the lenses is 254 µm. The greater the number of lines (number of lens arrays) per inch, the smaller the pitch of the lenses, and the further the definition is improved.

A low-definition (for example, 60 LPI) lenticular sheet is suitable for being used as a poster displaying artwork that is observed from a relatively distant position. However, in a case where the lenticular sheet is used as a business card for the purpose of making small-sized character information read, the number of lines of lenses arrayed in a row to constitute the lenticular lens layer is preferably equal to or greater than 100 per 2.54 cm (1 inch). In contrast, from the viewpoint of the resolution of the lenticular image, the number of lines of convex lenses arrayed to constitute the lenticular lens layer is more preferably equal to or less than 200 (200 LPI) per 2.54 cm.

(Lenticular Image)

In the present embodiment, the lenticular image contains character information that is each independently displayed in a plurality of languages. The lenticular image is formed such that, when the lenticular image is observed through the lenticular lens layer, the languages displaying the character information are switched with each other according to the observation angle.

The method for forming the lenticular image is not particularly limited, and examples thereof include offset printing, ink jet printing, and the like. From the viewpoint of on demand printing, an ink jet printing method is preferable.

No matter what kind of printing method is adopted, the size of a dot printed for forming a lenticular image is preferably equal to or less than (pitch of convex lenses÷number of image columns per lens). For example, in a case where 12 image columns are formed for each of 100 LPI lenses (lens pitch: 254 µm), a dot diameter of equal to or less than 254 µm÷21≈21 µm is preferable. The smaller the dot diameter, the clearer the displayed image displayed, and a feeling of an afterimage and cutting (sharpness) at the time of switching are improved.

For example, in a case of business card, the name is frequently written in the largest characters. In this case, in order to reduce the feeling of an afterimage, it is preferable to use a font written in fine lines such as Mincho-style font instead of a font written in thick lines such as Gothic font.

FIG. 4 is a schematic view showing an example of a convex lens 32A in a portion of the lenticular display body according to the present embodiment and the disposition of image columns constituting each display language. In the lenticular display body shown in FIG. 4, an image layer 26 is formed on the surface (on the side opposite to the transparent resin substrate 12) of the ink receiving layer 22, and each of the image column for the first language, the image column for the second language, and the image column for the third language as lenticular images is disposed in parallel with the longitudinal direction of the convex lens 32A (a direction perpendicular to an array direction y of the convex lens 32A within the smooth surface of the lenticular lens 12). The image column for each language is disposed under one convex lens 32A along the width direction of the convex lens 32A in a state of forming a group (image column group) consisting of 4 image columns.

Figure 3A:
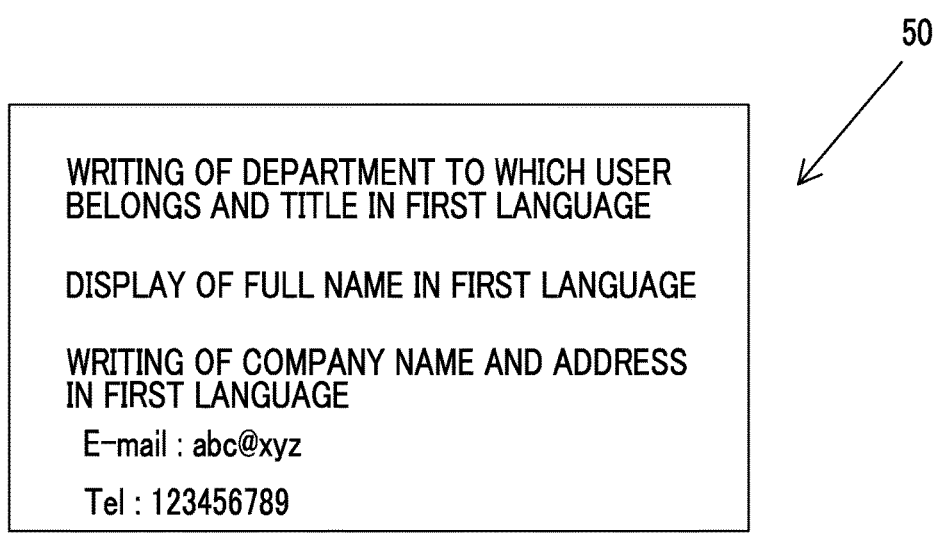
FIGS. 3A, 3B and 3C are schematic views showing, as an example of a lenticular display body according to an embodiment of the present disclosure, a business card in which three languages are switched with each other according to an observation angle.
Figure 3B:
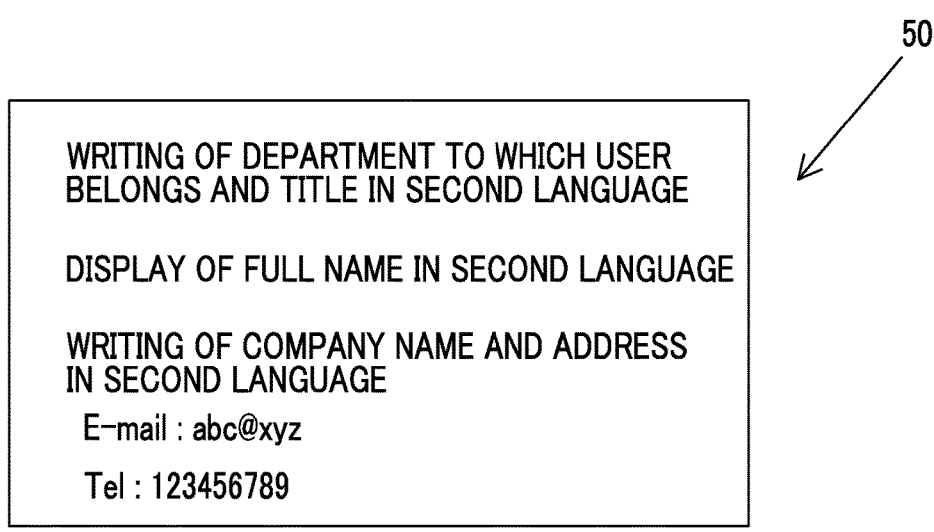
Figure 3C:
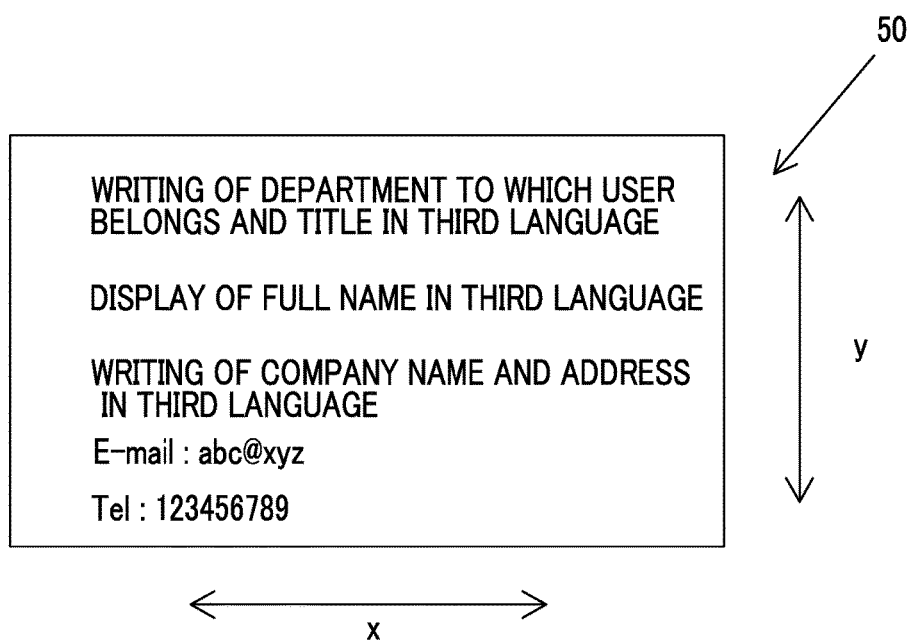

In this way, under each convex lens 32A, image columns for each of three languages are disposed. Accordingly, when an observer observes the image through the lenticular lens layer 32, for example, at an angle at which the image column for the first language disposed under each convex lens comes into view, only the image columns for the first language are visually synthesized as character information. As a result, as shown in FIG. 3A, the observer can read the character information displayed in the first language. The same is applied to the image columns for the second language and the image columns for the third language. That is, at an angle at which the image column for each language disposed under each convex lens 32A comes into view, the image columns are observed and synthesized, and in this way, the character information displayed in each language can be read as shown in FIG. 3B or FIG. 3C.

Figure 5:
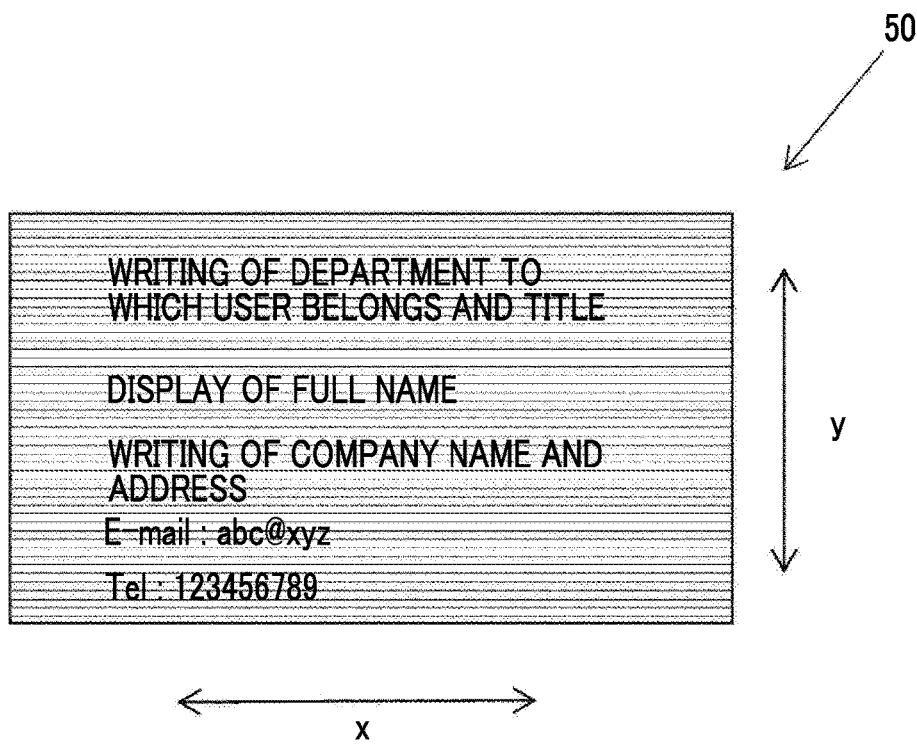
FIG. 5 is a schematic view showing an example of the disposition of a lenticular lens in a lenticular display body according to an embodiment of the present disclosure.
Figure 6:
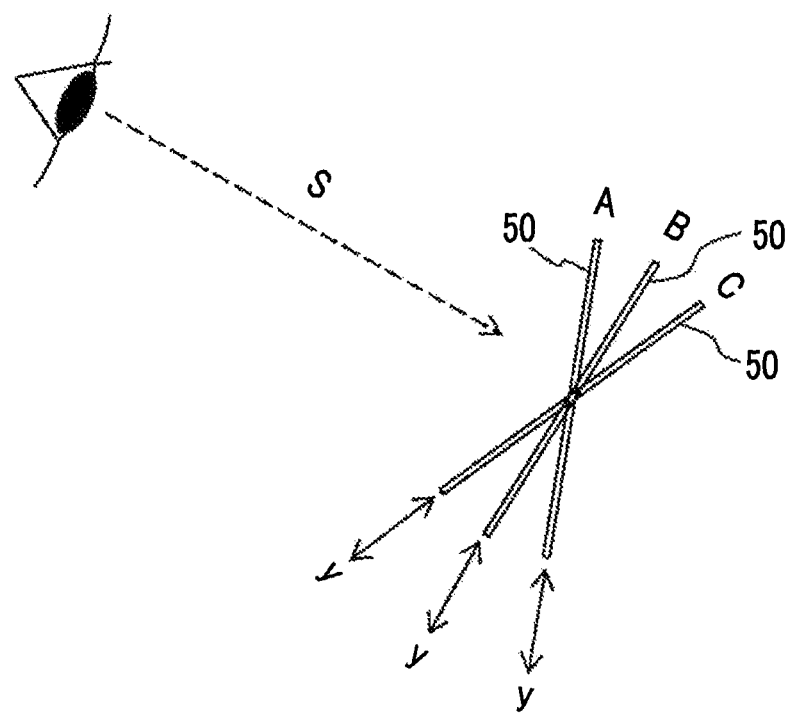
FIG. 6 is a schematic view showing an example of a change of an observation angle of a lenticular display body according to an embodiment of the present disclosure.

The longitudinal direction of the convex lens 32A constituting the lenticular lens layer 32 may be parallel or perpendicular to the longitudinal direction of each image column. However, it is preferable that the image column is disposed such that the longitudinal direction of the convex lens 32A is parallel to the longitudinal direction of each image column. For example, as shown in FIG. 5, in a case where the character column of each display language is disposed in an x direction, and the longitudinal direction of each image column constituting each display language is the x direction, it is preferable that the longitudinal direction of the convex lens 32A of the lenticular lens layer 32 is the x direction as well. If the longitudinal direction of the convex lens 32A is parallel to the longitudinal direction of each image column as described above, when a lenticular display body 50 is observed as shown in FIG. 6, by changing the angle of a y direction, which is perpendicular to the x direction (the longitudinal direction of each image column and the longitudinal direction of the convex lens), relative to the line of sight S of the observer, the display languages can be switched with each other as show in FIG. 3.

In the example shown in FIG. 4, under one convex lens 32A, each of three languages is constituted with 4 image columns, and hence a total of 12 image columns are arrayed. However, the array of the image column under each convex lens 32A is not limited to the example shown in FIG. 4. For example, the number of pixel columns disposed under one convex lens 32A is not limited to 12, and may be equal to or greater than the number of languages to be displayed (for example, in a case where three languages are displayed, the number of image columns is equal to or greater than 3). The greater the number of image columns arrayed under one convex lens 32A, the higher the resolution, but the data volume of the group of image columns increases. Therefore, the number of image columns disposed under one convex lens 32A is preferably equal to or less than 12.

The angle at which each language is displayed can be adjusted by the width of the image columns (number of image columns) of each display language arrayed under each convex lens 32A. For example, as shown in FIGS. 3 and 4, in a case where three languages are displayed by being switched with each other, and the observation angle at which the second language is displayed is widened, the number of arrayed image columns for the second language under one convex lens 32A may made greater than the number of arrayed image columns for other languages. For example, by arraying 6 pixel columns for the second language and arraying 3 pixel columns for each of the first and third languages under one convex lens, the observation angle for the second language can be widened.

The example of the lenticular display body 50 shown in FIGS. 3 and 4 is an aspect in which 3 languages are switched with each other according to the observation angle. However, the number of languages to be displayed is not particularly limited as long as two or more languages are displayed, and the image columns for each language may be arrayed such that 4 or more languages are switched with each other. Here, the greater the number of display languages, the lower the resolution, and the small characters or the characters written in fine lines are not easily read. Furthermore, the greater the number of display languages, the narrower the observation angle of each display language, and an angle at which different languages are seen overlapping each other is easily increased. From the viewpoint of displaying many languages and maintaining high readability, it is preferable that the number of languages switched with each other within one surface is preferably equal to or greater than 3 and equal to or less than 4.

FIG. 7 shows, as an example of the lenticular display body according to the present embodiment, a case where the character information of a business card are displayed in Japanese and English switched with each other. In the Japanese display shown in FIG. 7A, the logo of organization to which the user belongs, the department to which the use belongs, the title, the full name, the name of organization to which the user belongs, the address, the phone number, the FAX number, and the E-mail address are described in this order from the top. In contrast, in the English display shown in FIG. 7B, the logo of organization to which the user belongs, the name, the title, the department to which the user belongs, the name of organization to which the user belongs, the address, the phone number, the FAX number, and the E-mail address are described in this order.

In a case where the business card contains different display languages, the characters themselves are different, and furthermore, the position in which the characters are displayed or the order of displaying the characters is partially different in some cases. However, in FIG. 7, the display of the logo of organization to which the use belongs and the display of the E-mail address are common to two languages. In addition, a portion of the phone number (3-1234-0000) and a portion of the FAX number (3-1234-1111) are common to the languages. Moreover, URL is common to the respective languages, although the URL is not shown in the drawing.

If the items displayed by the same characters and the items such as a logo displayed by the same image other than characters (hereinafter, collectively referred to as "common items" in some cases), which commonly appear when the character information is displayed in different languages, are displayed different positions within the display surface for each language, the observer is likely to have a feeling of afterimage when the display is switched and to have a difficulty in reading because the characters are small. Therefore, as shown in FIGS. 7A and 7B, it is preferable that the common items are disposed such that they are displayed in the same position even if the observation angle is changed. Herein, "displayed in the same position" does not mean that the position does not change at all when the display languages are switched. It means that, even when two languages are displayed in a state of overlapping each other as the observation angle is changed, the position does not appear to be changed, and the observer can recognize that they are the common items. If the common items are displayed in the same position, even when the display languages are switched due to the change of the observation angle or two display languages overlap each other, the display site is not changed, and hence an effect of facilitating reading is obtained.

In a case where the character information can be displayed in 3 or more languages, the common items do not need to be common to all of the languages displayed. By displaying the common items common to at least two languages in the same position, the readability can be improved. For example, in a case where the display languages including Japanese, English, and Chinese can be switched with each other, by disposing the common items that are common only to Japanese and Chinese in the same position for the Japanese display and the Chinese display, the readability can be improved.

The lenticular display body according to the present embodiment may contain an image other than the character information. For example, if the lenticular display body is a lenticular business card, it may contain images such as a logo of an organization and a facial picture of a user other than characters. The images other than the character information may be switched together with the display languages according to the observation angle, or may be made into images that do not change even when the observation angle changes.

The lenticular display body according to the present embodiment may have a constitution in which the display language of only one surface changes, and the other surface remains blank or displays a fixed image. Furthermore, the lenticular display body may have a constitution in which the lenticular display body has a lenticular lens layer and a lenticular image on both surfaces, and the languages displaying the character information are switched with each other on both surfaces according to the observation angle. In a case where the constitution is adopted in which the languages displaying the character information are switched with each other on both surfaces, the same languages may be switched with each other on both surfaces, or different display languages may be switched with each other on both surfaces. For example, in a case of a lenticular business card, by adopting a constitution in which the first to third languages are displayed on one surface by being switched with each other while the fourth to sixth languages are displayed on the other surface by being switched each other, 6 languages can be displayed.

In addition, a constitution may be adopted in which one surface of the lenticular business card displays the character information such as the organization to which the user belongs and the full name in the first to third languages that are switched with each other while the other surface displays the advertisement such as the business contents of the organization to which the user belongs in the first to third languages that are switched with each other.

In a case where a constitution is adopted in which the character information is displayed on both surfaces, for example, two kinds of display bodies may be prepared which are obtained by combining a lenticular sheet and a lenticular image so as to enable each surface to perform display as intended, a layer that becomes background color (for example, a white layer such as paper) may be interposed between 2 kinds of the display bodies, and the display bodies may be bonded to each other in a state where the lenticular lens layer faces outward.

In any of the aspects in which the images of the character information are switched with each other on one surface or both surfaces, the area (background) other than the portion in which the images of the character information are formed may remain blank as in a general business card, or can be colored to such an extent that does not hinder character reading or can be patterned so as to reduce the feeling of afterimage given by the characters or images other than characters at the time of switching.

Hitherto, as an example of the aspect in which the character information is displayed in a plurality of languages switched with each other in the lenticular display body according to the present embodiment, a lenticular business card has been mainly described. However, the lenticular display body according to the present embodiment is not limited to a business card, and can be applied without limitation to display bodies containing character information, such as a menu of a restaurant or the like, a map, a poster, a route map of means of transportation, a timetable, a jacket of an optical disc such as compact disc (CD), a postcard, a lyric card, a product catalogue, and a calendar, as a display body displaying the character information in a plurality of languages switched with each other.

The lenticular image in the present embodiment is not limited to a case where the character information is displayed in a plurality of languages switched with each other. The lenticular display body according to the present embodiment can also be suitably applied to a case where images such as a picture and a photograph not including characters are displayed by being switched with each other.

The angle of 4 corners of the lenticular display body according to the present disclosure may stay 90° after cutting following printing. Alternatively, in order to improve the safety at the time of handling, the corners may be treated such that they are made round or planed off.

As described above, in the lenticular display body according to the present disclosure, images are switched with each other according to the observation angle. When the images are switched with each other, different parallax images for display overlap each other, and particularly, in a case where the parallax images for display include characters, sometimes it is difficult to read the characters. Therefore, in the lenticular display body according to the present disclosure, it is preferable that the image layer includes two or more kinds of parallax images for display arrayed in a lens array direction of the lenticular lens layer and a common image formed between the parallax images for display adjacent to each other by a portion common to the parallax images for display adjacent to each other.

Herein, "common image formed by a portion common to parallax images for display adjacent to each other" means, in a plurality of parallax images for display arrayed under the same lens, (I) an image including only a portion that does not change between the parallax images for display adjacent to each other or (II) an image including a portion that does not change between the parallax images for display adjacent to each other and a portion formed when a changing portion is substituted with an unchanging portion. For example, in a case where two parallax images for display adjacent to each other share the same background, and the characters are changed, the common image (I) is an image formed by removing portions that do not overlap each other among the character portions in two parallax images for display adjacent to each other, and the common image (II) is an image formed by substituting both of the overlapping portion and the non-overlapping portion of the character portions in the two parallax images for display adjacent to each other with the background.

Figure 8:
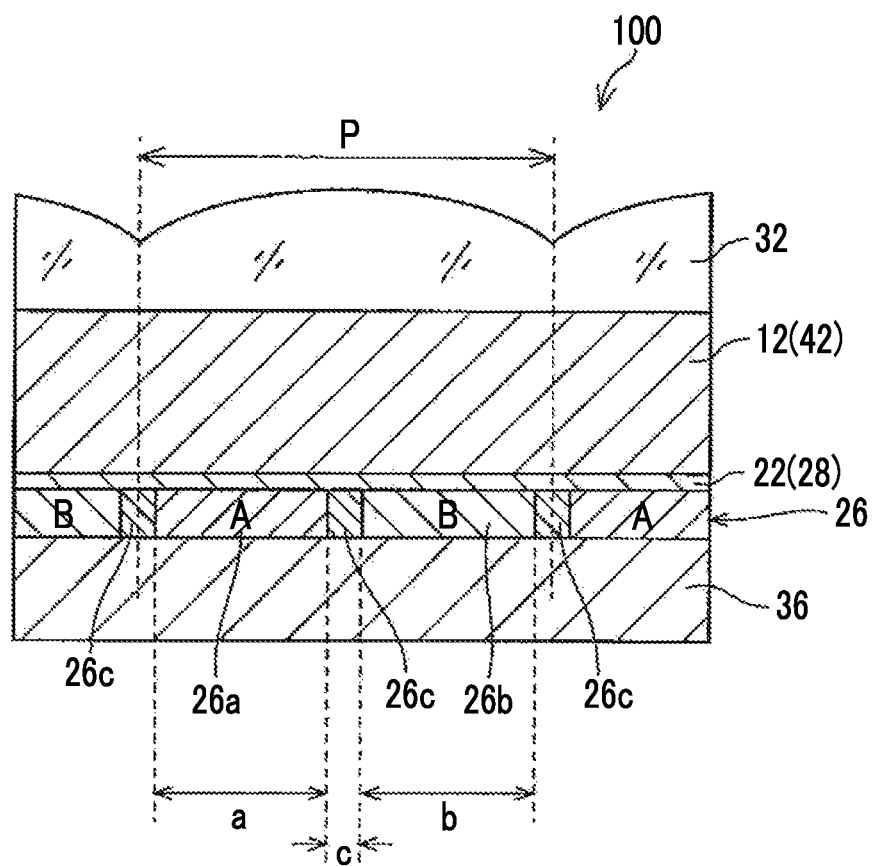
FIG. 8 is a schematic cross-sectional view showing an example of a lenticular display body according to an embodiment of the present disclosure.

FIG. 8 schematically shows an example of the constitution of the lenticular display body of the present disclosure. In a lenticular display body 100 shown in FIG. 8, an image layer 26 including two parallax images is formed on a surface of the ink receiving layer 22 (28) of the lenticular sheet according to the present disclosure. In the image layer 26, as parallax images for display, two images (an A image 26a and a B image 26b) sharing the common background are disposed to satisfy the lens pitch P of the lenticular sheet. Furthermore, between the A image 26a and the B image 26b, a common image 26c constituted with the background common to the A image 26a and the B image 26b is disposed. Between the A image 26a and the B image 26b of lenses adjacent to each other, the common image 26c is also disposed. In this way, in the lenticular display body of the present disclosure, the common image 26c is disposed between the parallax images (the A image 26a and the B image 26b) that are under each lens and adjacent to each other between lenses. Consequently, when an observer observes the images by moving his or her eyes relative to the lenticular display body, the angle at which the A image 26a and the B image 26b appear to overlap each other is narrowed, and hence the switchability of the images can be improved.

The lenticular display body according to the present disclosure can be obtained by forming parallax images on a surface of the ink receiving layer 22 (28) of the lenticular sheet according to the first embodiment or the second embodiment. From the viewpoint of protecting the parallax images, it is preferable to additionally provide a protective layer 36 on the surface of the image layer including the parallax images. The protective layer 36 is not particularly limited as long as it can protect the side of the parallax image-containing image layer that is opposite to the ink receiving layer side, and examples thereof include paper, a resin film, a metal sheet, styrofoam, and the like. For example, after the parallax images are formed on the surface of the ink receiving layer (the second ink receiving layer) of the lenticular sheet of the present disclosure, the protective layer 36 may be provided through an adhesive layer or without using an adhesive layer. For example, a method of bonding paper to the surface provided with the image layer can be used. Furthermore, the protective layer 36 may be provided by coating the surface, on which the parallax images are formed, with a coating material and then drying the coating material.

The thickness of the protective layer is not particularly limited, and may be determined according to the material constituting the protective layer and the purpose of the lenticular display body.

EXAMPLES

Hereinafter, the present invention will be more specifically described based on examples. The materials, the amount and proportion of the materials used, the treatment contents, the treatment procedure, and the like shown in the following examples can be appropriately changed within a scope that does not depart from the gist of the present invention. Accordingly, the scope of the present invention is not limited to the following specific examples.

In the following description, unless otherwise specified, "part" and "%" mean "part by mass" and "% by mass".

Example 1

<Preparation of Non-Stretched Laminate>
[Preparation of Transparent Resin Substrate of Non-Stretched Laminate]

First, a polyethylene terephthalate (hereinafter, described as PET) resin having an intrinsic viscosity of 0.64 polycondensed using a titanium compound as a catalyst was dried until the moisture content thereof became equal to or less than 50 ppm. The dried PET resin was melted in an extruder in which a heater temperature was set to be within a range of equal to or higher than 280° C. and equal to or lower than 300° C. The molten PET resin was extruded from a die portion onto a chill roll to which static electricity was applied, thereby obtaining a belt-like amorphous PET film. The obtained belt-like amorphous PET film was stretched in a longitudinal direction (hereinafter, "longitudinal direction" will be referred to as "MD direction" as well) by a factor of 3.3, thereby obtaining a belt-like uniaxially stretched PET film.

[Preparation of Non-Stretched Laminate]

In a state where the obtained uniaxially stretched PET film was being transported at a transport rate of 60 m/min, one surface of the uniaxially stretched PET film was coated with a coating solution A (a coating solution for forming an ink receiving layer) having the following composition by a bar coating method, and then coating solution was dried for 1 minute at 145° C., thereby obtaining a belt-like non-stretched laminate having a coating layer on one surface of the uniaxially stretched PET film.

[Composition of Coating Solution a (Coating Solution for Forming an Ink Receiving Layer)]

| | |
|---|---|
| Terminal blocked isocyanate (P1) of polyester-based polyurethane polymer (weight-average molecular weight: $6.0 \times 10^3$, solid content: 27%) | 62.34 parts |
| Blocked isocyanate (weight-average molecular weight: $1.0 \times 10^3$, WM44-L70G manufactured by Asahi Kasei Corporation., solid content: 70%) | 7.29 parts |
| Isocyanate reaction catalyst (aqueous organic tin dispersion, ERASTRON (registered trademark) CAT-21 manufactured by DKS Co., Ltd., solid content: 10%) | 0.44 parts |
| Anionic surfactant (sodium di-2-ethylhexyl sulfosuccinate, solid content: 1%) | 0.56 parts |
| pH adjuster (sodium hydrogen carbonate) | 0.23 parts |
| pH buffer (mixture of sodium hydrogen carbonate and sodium carbonate) | 1.92 parts |
| Silica (average primary particle size: 40 nm, PL3D manufactured by FUSO CHEMICAL CO., LTD.) | 2.01 parts |
| Aggregated silica (number-average particle size: 4 μm to 5 μm, AZ204 manufactured by Tosoh Silica Corporation.) | 0.20 parts |
| Lubricant (carnauba wax, carnauba wax dispersion SELOSOL (registered trademark) 524 manufactured by CHUKYO YUSHI CO., LTD., solid content: 30%) | 1.98 parts |

The terminal blocked isocyanate (P1) of a polyester-based polyurethane polymer contained in the coating solution A was prepared according to the following procedure.

34 parts of hexamethylene diisocyanate was added to 200 parts of polyester of an ethylene oxide adduct of bisphenol A and maleic acid so as to perform a reaction, and 73 parts of a 30% aqueous sodium bisulfite solution was added thereto, followed by stirring. Then, the resultant was diluted with water, thereby obtaining the terminal blocked isocyanate (P1) of a polyester-based polyurethane polymer having a solid content of 27%.

<Preparation of Stretched Laminate>

The belt-like non-stretched laminate prepared as above was stretched by a stretching device in a width direction (a direction orthogonal to the stretching direction in the uniaxially stretched PET film, hereinafter, referred to as "TD" direction as well) by a factor of 4.0, thereby obtaining a stretched laminate 1 including an ink receiving layer having a thickness of 0.05 μm on one surface of a biaxially stretched PET film having a thickness of 250 μm.

<Preparation of Lenticular Sheet 1>

[Formation of Lenticular Lens Layer]

On a surface of the biaxially stretched PET film that is on the side opposite to the side of the stretched laminate 1 prepared as above provided with the ink receiving layer, a lenticular lens layer was formed according to the following procedure.

The belt-like stretched laminate 1 prepared as above was passed between an embossing roller (φ 350 mm, 40° C.) and a nip roller (φ 350 mm, 40° C.) while being transported at 20 m/min. The surface of the embossing roller had the shapes of lenticular lenses (radius: 150 μm, lens pitch: 254 μm).

Immediately before the stretched laminate 1 passed between the embossing roller and the nip roller, a glycol-modified polyethylene terephthalate (PET-G) resin (manufactured by SK Chemicals) for forming a lens layer and a resin (ADMER, trade name, manufactured by Mitsui Chemicals, Inc.) for forming an interlayer were laminated by being co-extruded from a T-die (ejection width: 330 mm) set to be at a temperature of 280° C. onto the surface of the biaxially stretched PET film of the stretched laminate 1 at a resin temperature of 260° C. to 280° C. that was actually measured. On the surface of the biaxially stretched PET film of the stretched laminate 1 that has passed between the embossing roller and the nip roller, a lenticular lens layer was formed. The thickness of the obtained lenticular lens layer was 350 μm.

Example 2

In Example 1, by using the coating solution A as a coating solution for forming an interlayer formed between the lens layer and the biaxially stretched PET film, in the same manner as in Example 1, a belt-like stretched laminate 2 was prepared which has a coating layer becoming an ink receiving layer after stretching on one surface of the uniaxially stretched PET film and a coating layer becoming an interlayer after stretching on the other surface of the uniaxially stretched PET film.

By stretching the obtained non-stretched laminate, a stretched laminate 2 was obtained which has an ink receiving layer having a thickness of 0.05 μm on one surface of the uniaxially stretched PET film having a thickness of 250 μm and an interlayer having a thickness of 0.05 μm on the other surface. Then, a lenticular lens layer was formed in the same manner as in Example 1, thereby preparing a lenticular sheet 2.

Example 3

A lenticular sheet 3 was prepared in the same manner as in Example 1, except that, in Example 1, the following coating solution B was used as a coating solution for forming an interlayer formed between the lens layer and the uniaxially stretched PET film.

[Composition of Coating Solution B (Coating Solution for Forming an Interlayer)]

| | |
|---|---|
| Water | 56.60 parts |
| Acrylic resin (A1, solid content: 28%) | 21.40 parts |

-continued

| | |
|---|---|
| Carbodiimide compound (manufactured by Nisshinbo Holdings Inc, CARBODILITE (registered trademark) V-02-L2, solid content: 40%) | 2.90 parts |
| Sulfosuccinic acid-based surfactant (manufactured by NOF CORPORATION, RAPISOL (registered trademark) A-90, solid content: 1%) | 8.10 parts |
| Polyethylene oxide-based surfactant (manufactured by Sanyo Chemical Industries, Ltd., NAROACTY (registered trade mark) CL-95, solid content: 1%) | 9.60 parts |
| Silica (manufactured by NISSAN CHEMICAL INDUSTRIES, LTD., SNOWTEX (registered trade mark) XL, solid content: 40%) | 0.40 parts |
| Lubricant (manufactured by CHUKYO YUSHI CO., LTD., a carnauba wax dispersion SELOSOL (registered trademark) 524, solid content: 30%) | 1.00 part |

As the acrylic resin (A1), an aqueous dispersion (solid content: 28% by mass) of an acrylic resin polymerized using a monomer having the following composition was used.

Emulsion polymer(emulsifier: anionic surfactant) of methyl methacrylate/styrene/2-ethylhexyl acrylate/2-hydroxyethyl methacrylate/acrylic acid=59/9/26/5/1(% by mass),Tg=45° C.

Example 4

A lenticular sheet 4 was prepared in the same manner as in Example 1, except that, in Example 1, instead of the coating solution A as the coating solution for forming an ink receiving layer, the coating solution B of Example 3 was used as the coating solution for forming an ink receiving layer.

Example 5

A lenticular sheet 5 was prepared in the same manner as in Example 1, except that, in Example 1, instead of the coating solution A as the coating solution for forming an ink receiving layer, a coating solution C having the following composition was used.

[Composition of Coating Solution C (Coating Solution for Forming an Ink Receiving Layer)]

| | |
|---|---|
| Aqueous solution of polyester resin (manufactured by GOO CHEMICAL CO., LTD., PLASCOAT (registered trademark) Z592, solid content: 25%) | 124.10 parts |
| Aqueous dispersion of polyurethane resin (SUPERFLEX (registered trademark) 150HS manufactured by DKS Co., Ltd., solid content: 38%) | 81.60 parts |
| Oxazoline compound (manufactured by NIPPON SHOKUBAI CO., LTD., EPOCROS K-2020E, solid content: 40%) | 69.90 parts |
| Sulfosuccinic acid-based surfactant (RAPISOL (registered trademark) B-90 manufactured by NOF CORPORATION, solid content: 1%) | 12.30 parts |
| Polyethylene oxide-based surfactant (manufactured by Sanyo Chemical Industries, Ltd., NAROACTY (registered trademark) CL-95, solid content: 1%) | 29.70 parts |
| PMMA particles (MR-2G manufactured by Soken Chemical & Engineering Co., Ltd., aqueous dispersion, solid content: 28%) | 1.00 part |
| Lubricant (manufactured by CHUKYO YUSHI CO., LTD., a carnauba wax dispersion SELOSOL (registered trademark) 524, solid content: 30%) | 2.90 parts |
| Preservative (manufactured by DAITO CHEMICAL CO., LTD. 1,2-benzothiazolin-3-one, methanol solution with solid content of 3.5%) | 1.10 parts |

Example 6

A lenticular sheet 6 (thickness: 200 μm) was prepared in the same manner as in Example 1, except that, in Example 1, the shapes of lenticular lenses having a radius of 80 μm and a lens pitch of 127 μm were formed on the surface of the embossing roller, and a stretched laminate was used which includes an ink receiving layer having a thickness of 0.05 μm on one surface of a uniaxially stretched PET film having a thickness of 150 μm.

Example 7

A lenticular sheet 7 having a thickness of 200 μm was prepared in the same manner as in Example 6, except that, in Example 6, the stretched laminate was replaced with a stretched laminate which includes an ink receiving layer having a thickness of 0.05 μm on one surface of the same biaxially stretched PET film having a thickness of 150 μm as in Example 6 and an interlayer having a thickness of 0.05 μm on the other surface.

Comparative Example 1

In Comparative Example 1, the same PET resin as in Example 1 used for preparing the transparent resin substrate of the non-stretched laminate of Example 1 was used. The molten PET resin was being discharged from a die and transported at 10 m/min, and in this state, the PET resin was passed between an embossing roller (diameter: 350 mm, 40° C.) and a nip roller (diameter: 350 mm, 40° C.). The embossing roller has the shapes of lenticular lenses (radius: 150 μm, lens pitch: 254 μm) on the surface thereof.

On a surface of the non-stretched PET film having passed between the embossing roller and the nip roller, a lenticular lens layer was formed. The thickness of the obtained lenticular sheet C1 was 350 μm.

Comparative Example 2

The belt-like amorphous PET film used in Example 1 was stretched by a stretching device in the longitudinal direction by a factor of 3.3 and then stretched in the width direction by a factor of 4.0, thereby obtaining a biaxially stretched PET film having a thickness of 250 μm.

In a state where the obtained biaxially stretched PET film was being transported at a transport rate of 60 m/min, one surface of the biaxially stretched PET film was coated with the coating solution A (coating solution for forming an ink receiving layer) by a bar coating method, and then the coating solution A was dried for 1 minute at 145° C., thereby obtaining a belt-like stretched laminate having an ink receiving layer (non-stretched) on one surface of the biaxially stretched PET film.

On the surface of the biaxially stretched PET film of the stretched laminate prepared as above that was opposite to the side provided with the ink receiving layer, a lenticular lens layer was formed in the same manner as in Example 1, thereby obtaining a lenticular sheet C2 (thickness: 350 μm).

Example 8

As coating solutions for forming an ink receiving layer and an interlayer, coating solutions D to F having the following composition were prepared.

[Composition of Coating Solution D (Coating Solution for Forming First Ink Receiving Layer)]

| | |
|---|---|
| Naphthalene ring-containing polyester (manufactured by GOO CHEMICAL CO., LTD., PLASCOAT (registered trademark) Z687, aqueous dispersion having solid content of 25%) | 302.43 parts |
| Carbodiimide compound (manufactured by Nisshinbo Holdings Inc, CARBODILITE (registered trademark) V-02-L2, solid content: 40%) | 136.21 parts |
| Sulfosuccinic acid-based surfactant (manufactured by NOF CORPORATION, RAPISOL (registered trademark) A-90, solid content: 1%) | 0.60 parts |
| Polyethylene oxide-based surfactant (manufactured by Sanyo Chemical Industries, Ltd., NAROACTY (registered trademark) CL-95, solid content: 1%) | 1.45 parts |
| PMMA particles (average particle size: 1 μm, manufactured by Soken Chemical & Engineering Co., Ltd., cross-linked PMMA particles, aqueous dispersion of MR-2G, solid content: 15%) | 0.30 part |
| Preservative (manufactured by DAITO CHEMICAL CO., LTD. 1,2-benzothiazolin-3-one, methanol solution with solid content of 3.5%) | 0.25 parts |

[Composition of Coating Solution E (Coating Solution for Forming Second Ink Receiving Layer)]

| | |
|---|---|
| Aqueous solution of polyester resin (manufactured by GOO CHEMICAL CO., LTD., PLASCOAT (registered trademark) Z592, aqueous dispersion having solid content of 25%) | 189.30 parts |
| Urethane resin (manufactured by DKS Co., Ltd., SUPERFLEX (registered trademark) 150HF, aqueous dispersion having solid content of 38%) | 189.36 parts |
| Oxazoline compound (manufactured by NIPPON SHOKUBAI CO., LTD., EPOCROS (registered trademark) K-2020E, solid content: 20%) | 60.02 parts |
| Sulfosuccinic acid-based surfactant (manufactured by NOF CORPORATION, RAPISOL (registered trademark) A-90, solid content: 1%) | 1.20 parts |
| Polyethylene oxide-based surfactant (manufactured by Sanyo Chemical Industries, Ltd., NAROACTY (registered trademark) CL-95, solid content: 1%) | 2.90 parts |
| Carnauba wax (manufactured by CHUKYO YUSHI CO., LTD., carnauba wax dispersion, SELOSOL (registered trademark) 524, solid content: 30%) | 5.00 parts |
| Polystyrene particle matting agent (average particle size: 1.9 μm, manufactured by ZEON CORPORATION, Nipol (registered trademark) UFN1008, solid content: 20%) | 1.50 parts |
| Preservative (manufactured by DAITO CHEMICAL CO., LTD., 1,2-benzothiazolin-3-one, methanol solution having solid content of 3.5%) | 0.25 parts |

[Composition of Coating Solution F (Coating Solution for Forming Interlayer)]

| | |
|---|---|
| Acrylic resin (Tg = 100° C.) | 79.49 parts |
| Carbodiimide compound (manufactured by Nisshinbo Holdings Inc, CARBODILITE (registered trademark) V-02-L2, solid content: 40%) | 73.08 parts |
| Sulfosuccinic acid-based surfactant (manufactured by NOF CORPORATION, RAPISOL (registered trademark) A-90, solid content: 1%) | 0.60 parts |

-continued

| | |
|---|---|
| Polyethylene oxide-based surfactant (manufactured by Sanyo Chemical Industries, Ltd., NAROACTY (registered trademark) CL-95, solid content: 1%) | 1.45 parts |
| Silica (average particle size: 40 to 60 nm, manufactured by NISSAN CHEMICAL INDUSTRIES, LTD., SNOWTEX (registered trademark) XL, solid content: 40%) | 2.16 parts |
| Silica (average particle size: 0.1 μm, silica particles manufactured by NIPPON SHOKUBAI CO., LTD., SEAHOSTAR (registered trademark) KE-W10, solid content: 15%) | 0.20 parts |
| Carnauba wax (manufactured by CHUKYO YUSHI CO., LTD., carnauba wax dispersion, SELOSOL (registered trademark) 524, solid content: 30%) | 3.94 parts |

<Preparation of Stretched Laminate>

The belt-like amorphous PET film used in Example 1 was stretched by a stretching device in the longitudinal direction by a factor of 3.3 and then stretched in the width direction by a factor of 4.0, thereby obtaining a biaxially stretched PET film having a thickness of 250 μm.

—Formation of Ink Receiving Layer—

In a state where the obtained biaxially stretched PET film was being transported at a transport rate of 60 m/min, one surface of the biaxially stretched PET film was coated with the coating solution D (the coating solution for forming a first ink receiving layer) by a bar coating method, and then the coating solution was dried for 1 minute at 145° C., thereby forming a first ink receiving layer (thickness: 0.45 μm).

The first ink receiving layer was coated with the coating solution E (the coating solution for forming a second ink receiving layer) by a bar coating method, and then the coating solution was dried for 1 minute at 145° C., thereby forming a second ink receiving layer (thickness: 0.45 μm).

—Formation of Interlayer—

The other surface of the biaxially stretched PET film was coated with the coating solution F (the coating solution for forming an interlayer) by a bar coating method, and then the coating solution was dried for 1 minute at 145° C., thereby forming an each independently represent (thickness: 0.1 μm). In this way, a belt-like stretched laminate 8 was obtained.

<Preparation of Lenticular Sheet 8>

[Formation of Lenticular Lens Layer]

On a surface of the interlayer of the stretched laminate 8 prepared as above, a lenticular lens layer was formed in the same manner as in Example 1, thereby preparing a lenticular sheet 8 (thickness: 351 μm).

[Formation of Parallax Image X]

By using the lenticular sheets 1 to 8 according to examples and the lenticular sheets C1 and C2 according to comparative examples, parallax image X was formed on a surface of the ink receiving layer according to the following procedure.

The parallax image X was formed such that the lens pitch of each lenticular sheet was satisfied.

<Ink>

Solventless active ray curable-type inks (DAICURE (registered trademark) RTX White, Black, Cyan, Magenta, and Yellow manufactured by DIC Corporation) were used.

<Offset Printing Plate>

By using a commercially available pre-sensitized plate (PS plate) for UV ink, an offset printing plate was prepared in which the parallax image X satisfying the lens pitch of each lenticular sheet was formed.

<Printing>

By using a commercially available offset printing machine and the aforementioned inks and offset printing plate, the parallax image X was printed on a surface of the ink receiving layer of each lenticular sheet.

For the prepared lenticular sheet having the parallax image X, the following evaluation was performed.

<Adhesiveness of Ink with Respect to Surface of Ink Receiving Layer>

On the surface of the parallax images, by using a razor, cuts were made in the form of a lattice in which a large number of rectangles each having a length of 1 mm and a width of 1 mm are arranged in a two-dimensional direction.

Onto the surface of the parallax images on which the lattice-like cuts were made, a pressure-sensitive adhesive cellophane tape having an area of about 50 mm (length)×30 mm (width) was bonded. The surface of the bonded pressure-sensitive adhesive cellophane tape was rubbed with a rubber eraser such that the pressure-sensitive adhesive cellophane tape adhered to the surface of the parallax images.

After 2 minutes elapsed from adhesion, the pressure-sensitive adhesive cellophane tape having adhered to the parallax images was instantaneously peeled off in a direction that is at a right angle to the surface of the parallax images.

Based on the number of rectangles of the parallax images peeled off, the adhesiveness was ranked and evaluated as below.

A: The number of rectangles of the parallax images peeled off was equal to or greater than 0 and equal to or less than 1.

B: The number of rectangles of the parallax images peeled off was equal to or greater than 2 and equal to or less than 6.

C: The number of rectangles of the parallax images peeled off was equal to or greater than 7.

<Adhesiveness Between Transparent Resin Substrate and Ink Receiving Layer>

From the surface of the parallax images, by using a razor, the cuts that penetrate the ink receiving layer and reaches the surface of the biaxially stretched PET film were made in the form of a lattice in which a large number of rectangles each having a length of 1 mm and a width of 1 mm are two-dimensionally arranged in a two-dimensional direction.

Onto the surface of the parallax images on which the lattice-like cuts were made, a pressure-sensitive adhesive cellophane tape having an area of about 50 mm (length)×30 mm (width) was bonded. The surface of the bonded pressure-sensitive adhesive cellophane tape was rubbed with a rubber eraser such that the pressure-sensitive adhesive cellophane tape adhered to the surface of the parallax images.

After 2 minutes elapsed from adhesion, the pressure-sensitive adhesive cellophane tape having adhered to the parallax images was instantaneously peeled off in a direction that is at a right angle to the surface of the parallax images.

Based on the number of rectangles of the ink receiving layer peeled off, the adhesiveness was ranked and evaluated as below.

A: The number of rectangles of the ink receiving layer peeled off was equal to or greater than 0 and equal to or less than 1.

B: The number of rectangles of the ink receiving layer peeled off was equal to or greater than 2 and equal to or less than 3.

C: The number of rectangles of the ink receiving layer peeled off was equal to or greater than 4 and equal to or less than 6.

D: The number of rectangles of the ink receiving layer peeled off was equal to or greater than 7 and equal to or less than 10.

E: The number of rectangles of the ink receiving layer peeled off was equal to or greater than 11.

<Diffusibility of Ink>

The dot sizes of images (halftone dots) formed by printing the same letters or images on the ink receiving layer were compared with the dot sizes of images formed on an offset printing plate, and based on a rate (%) of increase of area, the diffusibility of ink was evaluated.

A: The rate of increase of area was less than 5%.

B: The rate of increase of area was equal to or higher than 5% and less than 15%.

C: The rate of increase of area was equal to or higher than 15%.

<Dimensional Stability>

For evaluating dimensional stability, the sheet was cut in a size of 50 mm (length)×5 mm (width), the change of length at a temperature of 30° C. to 60° C. was measured, and a coefficient of thermal expansion (11° C.) was measured.

A: The coefficient of thermal expansion was less than $4.5 \times 10^{-5}/°$ C.

B: The coefficient of thermal expansion was equal to or greater than $4.5 \times 10^{-5}/°$ C. and less than $6.5 \times 10^{-5}/°$ C.

C: The coefficient of thermal expansion was equal to or greater than $6.5 \times 10^{-5}/°$ C.

<Color Reproducibility>

The color reproducibility for standard colors, cyan (C), yellow (Y), magenta (M), and black (K), was measured and evaluated according to the following evaluation rank based on the value of color difference $\Delta E$ between the lenticular sheet and a standard sample.

A: $\Delta F$ was smaller than 2.0.

B: $\Delta F$ was equal to or greater than 2.0 and equal to or less than 6.0.

C: $\Delta E$ was greater than 6.0.

[Formation of Parallax Image Y]

By using the lenticular sheets 1 to 8 according to examples and the lenticular sheet C1 and C2 according to comparative examples, the following parallax image Y was formed on the surface of the ink receiving layer.

The parallax image Y was formed such that the lens pitch of each lenticular sheet was satisfied.

Figure 9:
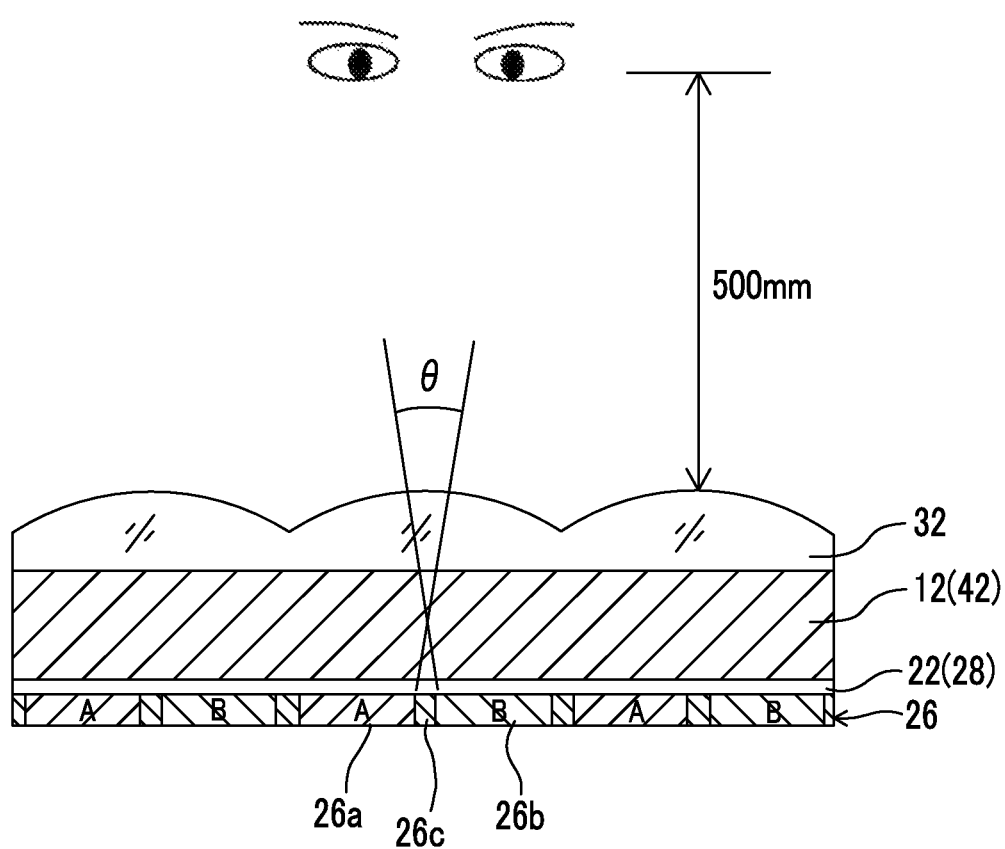
FIG. 9 is a schematic view illustrating how to evaluate display switchability of the lenticular display bodies prepared in examples and comparative examples of the present disclosure.

Two images (an A image and a B image) sharing the common background as shown in FIG. 9 will be described as an example. Specifically, the pitch (P) of the lenticular sheet was divided into 24 even portions; the A image 26a taking up 5/12 (the width a in FIG. 8) of the even portions is provided; the B image 26b taking up 5/12 (the width b in FIG. 8) of the even portions is provided; the common image 26c which corresponds only to the common background shared between the A image 26a and the B image 26b and takes up 1/12 (the width c in FIG. 8) of the even portions is provided; and the common image 26c which takes 1/12 of the even portions is provided between the A image 26a and the B image 26b adjacent to each other between lenses. As a result, the common image 26c taking up 1/24 of the even portions (width c/2), the A image taking up 5/12 of the even portions (width b), the common image 26c taking up 1/12 of the even portions (width c), the B image 26b taking up 5/12 of the even portions (width b), and the common image 26c taking up 1/24 of the even portions (width c/2) are arrayed under a single lens.

<Display Switchability>

For the lenticular display body obtained by forming the parallax image Y on the ink receiving layer of the lenticular sheet prepared in each example as described above, the display switchability was evaluated. As shown in FIG. 9, a distance (observation distance) between the eyes of an observer and the lenticular display body was set to be 500 mm, and the lenticular display body was observed. A circle having a radius of 500 mm in a plane perpendicular to a plane at which the lenses of the lenticular display body are arrayed, and perpendicular to a longitudinal direction of the lenticular lens, was supposed, and when the eyes were moved along the circle, an angle θ at which the A image and B image overlapped each other was determined. The smaller the angle θ, the better the display switchability. The display switchability was evaluated according to the following standards.

A: $0° < θ ≤ 2.5°$

B: $2.5° < θ ≤ 5.0°$

C: $5.0° < θ ≤ 7.5°$

The evaluation results of each lenticular sheet are shown in Table 1. In Table 1, the mark "-" shown in the section of evaluation of "adhesiveness between transparent resin substrate and ink receiving layer" for the lenticular sheet C1 means that the adhesiveness was not evaluated because the transparent resin substrate and the ink receiving layer were united.

TABLE 1

| | Evaluation | | | | | | |
|---|---|---|---|---|---|---|---|
| Lenticular sheet | Adhesiveness of ink | Adhesiveness between transparent resin substrate and ink receiving layer | Diffusibility of ink | Dimensional stability | Color reproducibility | Display switchability | Note |
| 1 | A | A | A | A | A | A | Present invention |
| 2 | A | A | A | A | A | A | Present invention |
| 3 | A | A | A | A | A | A | Present invention |
| 4 | B | A | A | A | A | A | Present invention |
| 5 | A | A | A | A | A | A | Present invention |
| 6 | A | A | A | A | A | A | Present invention |

TABLE 1-continued

| | Evaluation | | | | | | |
|---|---|---|---|---|---|---|---|
| Lenticular sheet | Adhesiveness of ink | Adhesiveness between transparent resin substrate and ink receiving layer | Diffusibility of ink | Dimensional stability | Color reproducibility | Display switchability | Note |
| 7 | A | A | A | A | A | A | Present invention |
| C1 | C | — | C~B | C~B | C~B | C | Comparative |
| C2 | B | D | A | A | A | B | Comparative |
| 8 | B | B | A | A | A | A | Present invention |

From Table 1, it is understood that the lenticular sheets of the present disclosure demonstrate excellent performance in all of the evaluations.

Example 9

By using the lenticular sheet 9 (lenticular lens layer: 200 LPI, lens pitch: 127 μm) which is the same as the lenticular sheet 6 prepared in Example 6, lenticular images including 3 languages consisting of English, Japanese, and Chinese changing to each other were offset-printed on the ink receiving layer of the lenticular sheet, thereby preparing a lenticular business card. The phone number (excluding the country code) and the E-mail address were disposed such that they were displayed in the same position as the items common to each country.

Example 10

By using the lenticular sheet 10 (lenticular lens layer: 200 LPI, lens pitch: 127 μm) which is the same as the lenticular sheet 6 prepared in Example 6, in the same manner as in Example 9, lenticular images including 3 languages consisting of English, Japanese, and Chinese changing to each other were offset-printed on the ink receiving layer of the lenticular sheet, thereby preparing a lenticular business card. Although the phone number (excluding the country code) and the E-mail address are items common to each country, they were disposed so as to be displayed in different positions on the display surface displaying each language.

The lenticular business card prepared in each of Examples 9 and 10 were observed by varying the observation angle such that the languages were switched with each other. As a result, it was confirmed that, in the lenticular business card of Example 9, the common items give no feeling of afterimage and are more easily read than in the lenticular business card of Example 10.

Example 11

By using a lenticular sheet 11 prepared in the same manner as the lenticular sheet 1, a lenticular business card was prepared by printing lenticular images including 3 languages consisting of English, Japanese, and Chinese changing to each other on the ink receiving layer of the lenticular sheet in the same manner as in Example 9, except that a 60 LPI lenticular lens layer was formed.

As a result of comparing the lenticular business card of Example 9 with the lenticular business card of Example 11 by varying the observation angle, it was confirmed that, in the lenticular business card of Example 9, even the characters having a font size of equal to or less than 8 pt could be more clearly read than in the lenticular business card of Example 11.

Example 12

White synthetic paper with an adhesive layer was bonded to a side (image side) of the lenticular business card prepared in Example 9 that is opposite to the convex lens side. As a result, the characters were not shown through, and hence the characters were more easily read than in Example 9.

Example 13

Two lenticular sheets 13 (lenticular lens layer: 200 LPI, lens pitch: 127 μm) which were the same as the lenticular sheet 6 prepared in Example 6 were used. On the ink receiving layer of one of the lenticular sheets, the character information was printed in Japanese, English, and Chinese, and on the ink receiving layer of the other lenticular sheet, the character information was printed in Korean, German, and Arabic. Then, the lenticular sheets were bonded to each surface of a sheet of white synthetic paper, thereby preparing a lenticular business card in which three different languages were switched with each other on each of both surfaces thereof. In this way, 6 languages could be displayed on a single business card.

Example 14

A lenticular sheet 12 was prepared in the same manner as the lenticular sheet 9, except that the lens pitch in the lenticular sheet 9 prepared in Example 9 was changed to 254 μm (100 LPI). On the ink receiving layer of the lenticular sheet, by using an ink jet printer UJF-6042 manufactured by Mimaki Engineering Co., Ltd., lenticular images including 3 languages consisting of English, Japanese, and Chinese changing to each other were printed, thereby preparing a lenticular business card.

As a result of observing the lenticular business cards prepared in Examples 9 and 14, it was confirmed that small characters are easily read.

The entire disclosures of JP2015-006067 filed on Jan. 15, 2015, JP2015-023701 filed on Feb. 9, 2015, and JP2015-134814 filed on Jul. 3, 2015 are incorporated into the present specification by reference.

All of the documents, patents, patent applications, and technical standards described in the present specification are incorporated into the present specification by reference, as if each of the documents, patents, patent applications, and technical standards are specifically and independently incorporated into the present specification by reverence.

What is claimed is:

1. A lenticular sheet comprising:
   a transparent resin substrate stretched in at least one direction;
   an ink receiving layer provided on one surface side of the transparent resin substrate; and
   a lenticular lens layer provided on another surface side of the transparent resin substrate,
   wherein the ink receiving layer is formed on the one surface side of the transparent resin substrate by stretching the transparent resin substrate which has not been stretched or has been stretched in a first direction and on which a coating layer has been formed by coating one surface side of the substrate with a coating solution for forming an ink receiving layer, and
   wherein the ink receiving layer contains a cross-linking agent and at least one resin, which is selected from a polyester, an acrylic resin, or a urethane resin and at least a portion of the resin is cross-linked by a cross-linking agent, and the cross-linking agent is at least one cross-linking agent selected from an oxazoline compound, a carbodiimide compound, or an isocyanate compound.

2. The lenticular sheet according to claim 1, further comprising:
   an interlayer containing a resin between the transparent resin substrate and the lenticular lens layer.

3. The lenticular sheet according to claim 1,
   wherein the transparent resin substrate stretched in at least one direction is a biaxially stretched polyethylene terephthalate film, and
   the ink receiving layer is formed by stretching the polyethylene terephthalate film, on which the coating layer has been formed by coating the substrate with the coating solution for forming an ink receiving layer, and which has been stretched in the first direction, in a second direction orthogonal to the first direction.

4. The lenticular sheet according to claim 1,
   wherein the lenticular lens layer has a plurality of lenses disposed at an interval of equal to or less than 257 µm.

5. The lenticular sheet according to claim 1 that has a thickness in a range of from 30 µm to 400 µm.

6. A method for manufacturing a lenticular sheet, the method comprising:
   a laminate forming step of forming a laminate, of a transparent resin substrate and a coating layer, by coating one surface side of the transparent resin substrate, which has not been stretched or has been stretched in a first direction, with a coating solution for forming an ink receiving layer;
   a laminate stretching step of stretching the laminate such that the ink receiving layer has been provided on the one surface side of the transparent resin substrate, and the transparent resin substrate is stretched in at least one direction; and
   a lenticular lens layer forming step of forming a lenticular lens layer on a side of the transparent resin substrate, which has been stretched in at least one direction, that is opposite to the side provided with the ink receiving layer, after the laminate stretching step, wherein the ink receiving layer contains a cross-linking agent and at least one resin, which is selected from a polyester, an acrylic resin, or a urethane resin and at least a portion of the resin is cross-linked by a cross-linking agent, and the cross-linking agent is at least one cross-linking agent selected from an oxazoline compound, a carbodiimide compound, or an isocyanate compound.

7. The method for manufacturing a lenticular sheet according to claim 6, wherein the laminate forming step further comprises coating another surface of the transparent resin substrate with a coating solution for forming an interlayer, and the lenticular lens layer forming step comprises forming the lenticular lens layer on the interlayer formed on a side of the transparent resin substrate.

8. The method for manufacturing a lenticular sheet according to claim 6,
   wherein the transparent resin substrate in the laminate forming step is a uniaxially stretched polyethylene terephthalate film stretched in the first direction, and
   a stretching direction in the laminate stretching step is a second direction orthogonal to the first direction in the uniaxially stretched polyethylene terephthalate film.

9. A lenticular sheet comprising:
   a transparent resin substrate;
   a first ink receiving layer provided to contact one surface of the transparent resin substrate;
   a second ink receiving layer provided on a side of the first ink receiving layer that is opposite to the transparent resin substrate side; and
   a lenticular lens layer provided on another surface side of the transparent resin substrate,
   wherein an adhesiveness of the first ink receiving layer with respect to the transparent resin substrate is higher than an adhesiveness of the second ink receiving layer with respect to the transparent resin substrate, and
   an adhesiveness of the second ink receiving layer with respect to ink is higher than an adhesiveness of the first ink receiving layer with respect to ink, and wherein each of the first ink receiving layer and the second ink receiving layer independently contains a cross-linking agent and at least one resin, which is selected from a polyester, an acrylic resin, or a urethane resin and at least a portion of the resin is cross-linked by a cross-linking agent, and the cross-linking agent is at least one cross-linking agent selected from an oxazoline compound, a carbodiimide compound, or an isocyanate compound.

10. A lenticular display body comprising:
    the lenticular sheet according to claim 1; and
    an image layer including two or more kinds of parallax images for display that are arrayed in a direction perpendicular to a longitudinal direction of a lenticular lens of the lenticular lens layer,
    wherein the image layer is provided on a surface of the ink receiving layer of the lenticular sheet.

11. The lenticular display body according to claim 10,
    wherein the image layer includes the two or more kinds of parallax images and a common image formed between adjacent parallax images by a portion common to the adjacent parallax images.

12. The lenticular display body according to claim 10, further comprising:
    a protective layer protecting the image layer.

13. The lenticular display body according to claim 10,
    wherein the two or more kinds of parallax images included in the image layer contain character information to be independently displayed in a plurality of languages, and
    when the image layer is observed through the lenticular lens layer, the languages in which the character information is displayed are switched with each other according to an observation angle.

14. A business card, comprising the lenticular display body according to claim 13.

15. The lenticular display body according to claim 13, wherein the character information is displayed in three or more languages that are switched with each other according to the observation angle.

16. The lenticular display body according to claim 13, wherein the image layer includes common items common to at least two languages among the plurality of languages, and when the observation angle is changed, the common items are displayed in the same position between the at least two languages including the common items.

17. The lenticular display body according to claim 13, wherein the lenticular lens layer and the image layer are provided on both surfaces of the lenticular display body, and on the both surfaces, the languages in which the character information is displayed are switched with each other according to the observation angle.

18. The lenticular display body according to claim 10, wherein paper is bonded to the surface of the lenticular display body provided with the image layer.

19. The lenticular display body according to claim 17, wherein:

the lenticular lens layer and the image layer are provided on both surfaces of the lenticular display body, the image layer on one surface contains character information displayed in first to third languages that are switched with each other according to the observation angle, and the image layer on the other surface contains character information displayed in fourth to sixth languages that are different from the first to third languages respectively and switched with each other according to the observation angle.

20. The lenticular sheet according to claim 2, wherein a film thickness of the interlayer is in a range of from 0.05 µm to 0.1 µm.

21. The method for manufacturing a lenticular sheet according to claim 7, wherein a film thickness of the interlayer is in a range of from 0.05 µm to 0.1 µm.

* * * * *